US011937339B2

(12) United States Patent
Ross et al.

(10) Patent No.: US 11,937,339 B2
(45) Date of Patent: Mar. 19, 2024

(54) METHOD FOR PROVISIONING A WIRELESS DEVICE USING A SMARTPHONE APPLICATION

(71) Applicant: INSEEGO CORP., San Diego, CA (US)

(72) Inventors: John Ross, San Diego, CA (US); Christopher Yeatts, San Diego, CA (US); Ashish Sharma, San Diego, CA (US)

(73) Assignee: INSEEGO CORP., San Diego, CA (US)

( * ) Notice: Subject to any disclaimer, the term of this patent is extended or adjusted under 35 U.S.C. 154(b) by 124 days.

(21) Appl. No.: 17/313,489

(22) Filed: May 6, 2021

(65) Prior Publication Data

US 2022/0360972 A1   Nov. 10, 2022

(51) Int. Cl.
*H04W 8/22* (2009.01)
*G06K 7/14* (2006.01)
*H04W 4/80* (2018.01)
*H04W 76/10* (2018.01)

(52) U.S. Cl.
CPC ............ *H04W 8/22* (2013.01); *G06K 7/1417* (2013.01); *H04W 4/80* (2018.02); *H04W 76/10* (2018.02)

(58) Field of Classification Search
CPC .......... H04W 8/22; H04W 4/80; H04W 76/10
See application file for complete search history.

(56) References Cited

U.S. PATENT DOCUMENTS

| 9,173,115 | B2 | 10/2015 | Sundareswaran |
| 9,326,091 | B2 | 4/2016 | Donnellan |
| 9,838,252 | B2 | 12/2017 | Lin |
| 2013/0210412 | A1 | 8/2013 | Larson |
| 2020/0403875 | A1* | 12/2020 | Rooney ................. H04W 48/16 |
| 2021/0037447 | A1* | 2/2021 | Tarighat Mehrabani ..................... H04W 40/248 |

OTHER PUBLICATIONS

Netgear "How to Install Your Orbi WiFi System | Netgear" How to Install Your Orbi WiFi System | Netgear—YouTube, Jul. 31, 2019, ahttps://youtu.be/WACCry4i-q8.

* cited by examiner

*Primary Examiner* — Curtis B Odom
(74) *Attorney, Agent, or Firm* — SHEPPARD, MULLIN, RICHTER & HAMPTON LLP; Hector A. Agdeppa; Daniel N. Yannuzzi

(57) ABSTRACT

A Fixed Wireless Access (FWA) device can include identification information disposed on an exterior surface of the FWA device. The FWA device can be configured to receive over a local communication network from a mobile device, provisioning information associated with the FWA device based on the identification information and install the provisioning information in a memory unit. The FWA device can establish cellular connectivity with a network base station based on the provisioning information. The provisioning information can be obtained by the mobile device scanning the identification information, providing the identification information to a server, and receiving the provisioning information from the server based on the identification information.

20 Claims, 8 Drawing Sheets

METHOD FOR PROVISIONING A WIRELESS DEVICE USING A SMARTPHONE APPLICATION

TECHNICAL FIELD

The present disclosure relates generally to cellular network connected devices, such as fixed wireless access (FWA) devices, and in particular, to provisioning cellular network connected devices and related provisioning application.

DESCRIPTION OF RELATED ART

Wireless communications have become ubiquitous in today's society, and as wireless systems capabilities increase so does the adoption rate of wireless technologies. Today, wireless technologies are fast overtaking and replacing conventional wired technologies and infrastructure. Each wireless device, to access wireless or cellular networks employing these technologies, should have installed provisioning information installed at the devices. Typically, provisioning information for connecting to a cellular network is installed at the factory.

5G is a standard promulgated by the International Telecommunication Union (ITU) and the 3rd Generation Partnership Project (3GPP), with the ITU setting the minimum requirements for 5G compliance, and the 3GPP creating the corresponding specifications. 5G is a successor to the 4G/Long Term Evolution (LTE) standard and refers to the fifth generation of wireless broadband technology for digital cellular networks. 5G is intended to replace or augment 4G/LTE. Touted advantages of 5G include, e.g., exponentially faster data download and upload speeds, along with much-reduced latency (also referred to as "air latency," i.e., the time it takes for a device to communicate with the network). A 5G high-band spectrum band, or millimeter wave (mmWave) operates between 25 GHz and 100 GHz. The term millimeter is associated with this high-band spectrum because wavelengths in this portion of the spectrum range from, e.g., 1-10 mm. Devices operating on this third band can deliver the highest data speed (e.g., up to 10 Gbps) and the lowest latency (e.g., 1 ms). However, its coverage area (the distance it can transfer data) is less than that of the low-band and mid-band spectrums, due in part to propagation losses at these high frequencies. Use of mmWave technology may nevertheless be desirable because the low-band and mid-band portions of the spectrum are already heavily congested with, e.g., TV and radio signals, as well as 4G/LTE traffic, and so long as the limited coverage area is acceptable, the benefits of mmWave technology can still be realized.

BRIEF SUMMARY OF THE DISCLOSURE

The present disclosure includes systems, devices, and methods for provisioning cellular network connected devices provisioned before being deployed or connected to a cellular network. Devices may include wireless access devices, such as fixed wireless access devices, or a mobile device (such as a mobile phone). Systems may include wireless access devices and mobile phones.

In accordance with the present disclosure, a Fixed Wireless Access (FWA) device can include identification information disposed on an exterior surface of the FWA device. The FWA device can include a processor. The FWA device can include a memory unit operatively coupled to the processor. The memory unit can include computer code that when executed, causes the processor to perform one or more functions. The computer code can cause the processor to receive provisioning information associated with the FWA device based on the identification information. The provisioning information may have been received over a local communication network from a mobile device. The computer code can cause the processor to install the provisioning information in the memory unit. The computer code can cause the processor to establish cellular connectivity with a network base station based on the provisioning information. In some embodiments, the provisioning information may have been obtained by the mobile device scanning the identification information, providing the identification information to a server, and receiving the provisioning information from the server based on the identification information.

In some embodiments, absent the provisioning information, the FWA device could not establish cellular connectivity. In other words, the provisioning information is required for the FWA to establish cellular connectivity.

In some embodiments, the memory unit includes computer code that when executed, causes the processor to transmit a confirmation over the local communication network to the mobile device that cellular connectivity has been established. In embodiments, the confirmation may include operational characteristics related to the cellular connection.

In embodiments, the memory unit includes computer code that when executed, causes the processor to receive (i.e. over the local communication network from a mobile device), instructions to add to or change the computer code to add to the memory unit. In embodiments, the computer code, when executed, may cause the processor to receive updates to the program code in the memory unit by the cellular connection.

In accordance with some embodiments, the FWA device can be a 5G capable FWA device. In some embodiments, the network base station can be a 5G small cell or 5G macro base station. In some embodiments, the local communication network can include a near field communications wireless channel, a Bluetooth® wireless channel, or a wired channel. In some embodiments, the identification information disposed on the exterior surface of the FWA device is embedded in a quick response (QR) code.

In accordance with some embodiments, a mobile device for provisioning cellular connectivity information to a fixed wireless access device can include a sensor. In some embodiments, the sensor is an imaging sensor. In some embodiments, the mobile device can include one or more processors and a memory unit operatively coupled to the processor. In some embodiments the memory unit can include computer code that when executed causes the processor to perform one or more functions. In embodiments, when executed, the computer code can cause the processor to obtain first identification information associated with a FWA device by imaging at least a portion of the FWA device by the sensor. In some embodiments, the computer code can cause the processor to retrieve, from the server, provisioning information associated with a FWA device. In some embodiments, the computer code can cause the processor to transmit the provisioning information to the FWA device over a local communication network.

The computer code, when executed, can cause the processor to receive a confirmation from the server or the FWA device that the FWA device has established cellular connectivity with a network base station. The confirmation can be received over a local communication network. The confirmation can be based on the installation of the provisioning information. In some embodiments, the computer code, when executed, causes the processor to transmit the first identification information to a server. In some embodiments, the retrieved provisioning information associated with a FWA device is based on the transmitted identification information.

In some embodiments, the provisioning information is transmitted to the FWA device over a Wi-Fi channel or a near field communications channel. The local communication channel can include a Wi-Fi channel or a near field communications channel.

In some embodiments, the computer code includes a provisioning application executable on the mobile device. The provisioning application, when executed on the mobile device, can include one or more presented cues which guide a user in establishing a cellular service. In some embodiments, the sensor can be an imaging sensor, and the cues can guide the user in aligning the sensor with the at least a portion of the FWA device for imaging by the sensor.

In some embodiments, absent transmission of the provisioning information to the FWA device, the FWA device could not establish cellular connectivity.

In some embodiments, the computer code, when executed, can cause the processor to receive second identification information associated with a FWA device from the FWA device and confirm the second identification information received from the FWA device matched the first identification information obtained by imaging the at least a portion of the FWA device by the sensor. In embodiments, the second identification information may have been received by the local connection.

In embodiments, the first identification information obtained by imaging the at least a portion of the FWA device, may have be embedded in a quick response (QR) code at the FWA device. In some embodiments, the mobile device is a smartphone, tablet, personal computer, or laptop

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
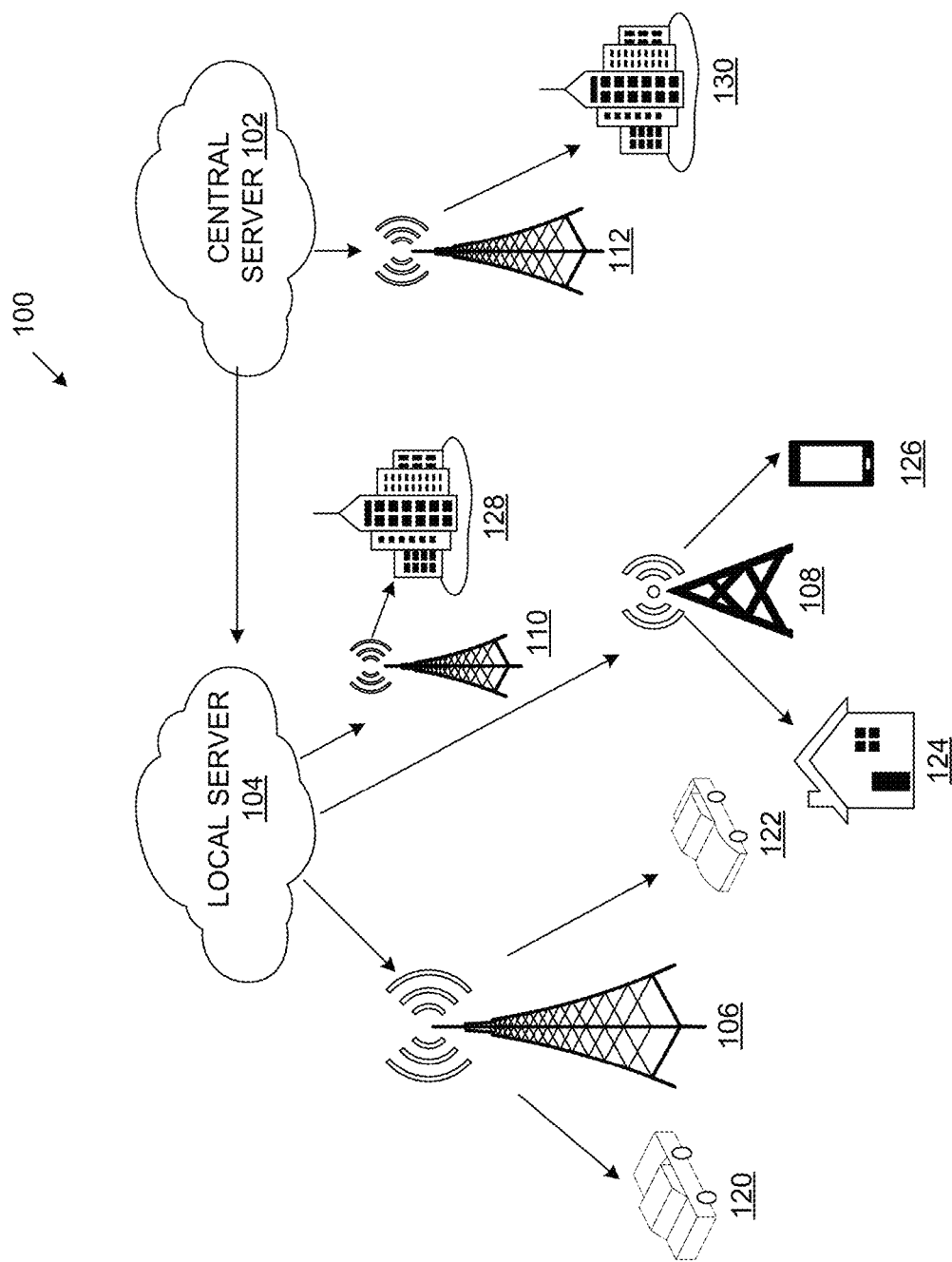
FIG. 1 is a schematic representation of an example 5G network in which various embodiments of the present disclosure may be implemented.

The figures are not exhaustive and do not limit the present disclosure to the precise form disclosed.

DETAILED DESCRIPTION

As alluded to above, cellular network connected devices may require to be provisioned before being deployed or connected to a cellular network.

Provisioning information for cellular network connected devices (or target device, herein), such as mobile or fixed wireless access devices, includes firmware, and/or information on wireless carrier deployment settings, and requirements. For example, this can be related to regions, hardware settings for the device, and/or programmable radio instructions. It can also include subscription information or profile settings related to a device or user. Generally, as alluded to above, provisioning information is required for the cellular network connected device to access the cellular network.

Typically, provisioning information for connecting to a cellular network is installed on the target device at the factory. However, this causes operational and/or manufacturing inefficiencies. For example, the manufacturer may require separate SKUs for each type of configuration of provisioning information, such as carrier and/or region specific configurations. Because of the diversity of wireless carrier deployments and requirements, it is difficult to maintain a single product SKU from a configuration and programing perspective in a manufacturing environment.

To optimize operational efficiencies, product variation can be kept to a minimum. This includes device hardware, packaging, and labels, as well as software and programming settings. If the device's final programming of settings can be postponed until the point where the device is powered-up for the first time, the manufacturing can be limited to a single product SKU and/or single set of software and programming settings which allows for operational benefits such as minimizing product variation. Various implementations provided herein allow for optimizing operational efficiencies, for example, by delaying or postponing the final programming of settings.

Over the air (OTA) (e.g. by the cellular network) update or download of information is available, but only when the device has at least some of the provisioning information already on the device. For example, carrier specific and/or region specific settings should already be on the device. Thus, OTA download of information is only possible if the target device is already connected to the cellular network.

Over the air download of provisioning information is not available if the target device is not provisioned for accessing a cellular network. For example, the opportunity for over the air download of provisioning information is not available if the cellular connection would be with a new carrier. Such a new carrier may have been deployed after the device has left the factory and the opportunity to install the provisioning information at the factory has lapsed. Further, this opportunity would not be available if the device was shipped without the requisite settings. Thus, provisioning information for connecting to a cellular network is required for the wireless device to access the cellular network in the first place so over the air updates of this information are not available for download of this provisioning information. This is generally analogous to the "chicken/egg" problem.

Various implementations described herein solve this problem, for example, by delaying or postponing provisioning of the network connected device.

Further, even if OTA update of information is available (for example if the device was already provisioned), there could be cellular signal interruptions. This issue could be especially problematic for highly congested bands of spectrum, but also high-band of spectrum of 5G or millimeter wave (mmWave), which operates between 25 GHz and 100 GHz. Devices operating on this high band can deliver the highest data speed (e.g., up to 10 Gbps) and low latency (i.e. compared to low and/or mid bands, e.g., 1 ms). However, this band may have limited coverage area (the distance it can transfer data) due in part to poor building and weather penetration. Updating information, at least initially (i.e. at device power-on) by means other than OTA, could be more reliable.

With the promise of data speeds on the order of Gigabits per second (Gbps), despite being a "mobile" standard, 5G technology can offer the possibility of providing, e.g., home broadband services over cellular networks. Fixed Wireless Access (FWA) can refer to a method or process of accessing a communications network or internet via fixed wireless network access devices, or customer premises equipment (CPEs). Accordingly, FWA can be used to realize 5G home broadband service over cellular networks. With respect to the disclosure herein, FWA devices can be fixed, however aspects described herein may relate to a user moving the FWA device around, for example within a building.

FWA may be thought of as a type of wireless broadband data communication that is effectuated between two fixed locations that are connected by FWA devices and/or equipment. FWA may be useful in areas where implementing wired broadband access (laying cable/wire) is prohibitively expensive, impractical, etc. especially in densely populated areas. In areas were wired broadband access already exists and/or would be cheap to implement, FWA may still be used to support software-defined networking in a wide area network (SD-WAN) with traffic bursting, as a backup to existing networks, etc. However, as noted above, the frequency of mmWave signals are so high that they cannot penetrate most building materials, e.g., cement or brick, or is attenuated/reflected so much that its utility is lost (e.g., on the order of above 20-50 dB). Even propagation through air results in signal loss, thereby limiting the efficacy of mmWave to smaller areas as alluded to above. Moreover, mmWave signals have poor multipath propagation. Factors that may compound these issues include, for example, a common desire by end users to place equipment wherever they desire (for convenience, aesthetics, etc.). Additionally, if installation is to be performed by a professional installer/technician, proper installation at the outset (without repeated attempts) results in better perceived customer service, and may cut down on the expense and time associated with subsequent attempts at installation. Thus, proper or optimal location/orientation of a 5G FWA device can be an important factor to the success of using a 5G FWA device.

Further, it may be important to provision 5G FWA devices or otherwise install settings before they are installed at optimal location/orientation for cellular connectivity, because these devices should be provisioned so that the optimal location/orientation is determined.

As alluded to above, however, provisioning information is required for access to a cellular network, and even if the device is able to access the network for OTA updates, the issues preventing OTA updates may be compounded for 5G FWA devices.

In accordance with various embodiments, one or more systems, methods, and/or applications for provisioning a 5G FWA devices may be provided. It is also understood that systems, methods, and/or applications described herein can be provided for other cellular connected devices other than 5G FWA devices. For example, a provisioning application may be provided to users to assist with provisioning of a 5G FWA device.

The provisioning application may provide a convenient user interface by which users are guided through various steps to provision their devices. Moreover, a user, technician, a carrier or MNO, a 5G FWA vendor, may be provided a seamless interface, through a cloud service for remote provisioning, monitoring, and management. From a consumer perspective, similarly, a seamless provisioning application can be achieved, negating the need to schedule (often-times) large windows of time for 5G FWA device provisioning and/or installation.

Devices can be ordered and received from a MNO or vendor of 5G FWA devices conveniently. In some cases, a consumer need not be disturbed by installation professionals, especially in times where in-person/home/business visits may be difficult to schedule and perform. In cases where a 5G FWA device may need to be re-installed or upgraded (software, firmware, etc.), an end user, if he/she desires, can attend to such tasks. Moreover, automated notifications regarding any one or more aspects/characteristics/features of a 5G FWA device can be sent to a user for monitoring purposes, adjustment purposes, and so on. From an installer's perspective, the use of various embodiments may reduce installation time, reduce manual paperwork, provide a detailed record of the installation, and can help ensure optimal operation of provisioned 5G FWA devices, any one or more of which may lead to better customer satisfaction, increased revenue, and so on.

The provisioning application may be executed on a mobile device, laptop, and/or another 5G FWA device. The user may activate the application at, after, or before receiving and/or turning on the 5G FWA device. In other words, the 5G FWA device can be provisioned when the user has and/or is ready to use or deploy the device (as compared to provisioning at a factory). The provisioning application may assist the user in provision the 5G FWA device. Further, the provisioning application may allow for updating of other software and/or settings of the device. Moreover, the provisioning application may run diagnostic tests such as determining software version control (i.e. that the devices are updated with the latest settings and/or software), operational characteristics for the connection, such as signal strength, signal quality, performance rating, actual throughput (upload/download speed) and/or latency associated with the 5G FWA device. Further, the provisioning application may allow for the user to change and/or update carriers.

It should be understood that some embodiments described herein are presented in the context of an end-user provisioning application. An end user-provisioning application can allow for guided provisioning. However, the guided provisioning can also be applied in other contexts and/or for other users. For example, professional installers (e.g. who install the 5G FWA device at a fixed location) may leverage the disclosed functionality (or a subset thereof) to facilitate provisioning of a 5G FWA device on behalf of end-users, such as consumer end-users. That is, a consumer end-user may be presented with more detailed instructions/guiding steps and/or more simplistic instructions for provisioning, for example. On the other hand, a professional installer may still benefit from the convenience that various embodiments can provide, albeit with less instruction, e.g., less guided steps may be presented, or certain steps can be assumed to be performed by the professional installer, and guided step screens can be skipped or bypassed. In some embodiments, the information/guidance presented by the provisioning application can differ depending on the user. In some embodiments, the information/guidance presented by the provisioning application can differ depending on the carrier.

In some embodiments, the provisioning application may initially request self-identification from a user as either a consumer user or a professional user. In some embodiments, the user may enter a provided code or identifier to inform the provisioning application. In some embodiments, the flow or sequence of guidance/presentation of steps or information can adapt depending on user responses or input. For example, in some embodiments, options may be presented to a user via the provisioning application user interface to bypass or skip certain screens or information. If such options are leveraged, the provisioning application may assume a professional or more experienced user is performing or facilitating the provisioning of a 5G FWA device, and thus, may adapt information/guidance that is presented thereafter.

In some embodiments, the provisioning application may provide at least some cues to the user so that the user can be guided through steps for provisioning. Cues can be provided via graphics, textual cues, audio/visual communications/notifications on one or more devices, e.g., a mobile device, a cloud-based interactive application/mechanism, and the like.

It should be noted that the terms "optimize," "optimal" and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters. In the context of the present disclosure, optimal may be used to describe a location, orientation, or positioning of a 5G FWA device that provides a desired level of service or connection quality. In some embodiments, the optimal location, orientation, or positioning of a 5G FWA device may be realized relative to a threshold for such a level of service or connection quality. In other embodiments the optimal location, orientation, or positioning of a 5G FWA device may be the best out of some set of locations, orientations, or positions. As used herein, optimal can refer to selections of provisioning information, device and/or user profiles, firmware, software. Optimal selections can refer to the best out of some set that can be selected (i.e. a set of provisioning information). Optimal selections can refer to the selection that may realize a level of service or connection quality or speed, that is relative to a threshold for such a level of service or connection quality.

In still other embodiments, the provisioning application alluded to above may be enhanced with or may be part of a broader device management suite of tools/applications that can be implemented via a Web Browser-based user interface (UI), a mobile device application, and/or a cloud-based software service. In accordance with some embodiments, subsequent to or while provisioning a 5G FWA device, a device management application or function/tool provided with or in addition to the provisioning application may be used to monitor operating characteristics of the provisioned 5G FWA device, and/or manage one or more aspects of the operating characteristics of the provisioned 5G FWA device.

In some embodiments, the device management functionality of such applications/tools may be utilized prior to or during the provisioning application process. In accordance with various embodiments, subsequent to provisioning a 5G FWA device, a (self) installation or installation guidance application or function/tool provided with or in addition to the provisioning application may be used to assist the user or professional installer in installing the 5G FWA device in an appropriate location and/or orientation. In some embodiments, the installation guidance functionality of such applications/tools may be utilized prior to or during the provisioning application process.

Self installation application and device management application, and associated functionality, are included in U.S. patent application Ser. No. 17/028,197 which is incorporated herein by reference.

The provisioning application, device management, and or self-installation applications may be different aspects of a single mobile device application. In some embodiments, they may be separate mobile device applications, where relevant information regarding the provisioned 5G FWA device can be passed to the device management (or other) application.

In some embodiments, a user may provision, monitor and/or manage a provisioned 5G FWA device via a direct connection between a the provisioned 5G FWA device and hosted web UI. The web UI can be hosted by the 5G FWA device, or another device. In some embodiments, a user may monitor and/or manage the provisioned 5G FWA device via one or more cloud-based applications/interfaces. In some embodiments, one or more of the aforementioned cloud-based service(s), direct web UI(s), and mobile device application(s) may share relevant information and/or inter-operate such that a user may move between one or more of the service(s), UI(s), application(s) to provide continuous/consistent functionality across all platforms. It should be understood that in some embodiments, one or more of the above-described applications or tools may be used to provision, monitor and/or manage multiple provisioned 5G FWA devices (as well as end user or client devices/user equipment) operatively connected to the one or more provisioned 5G FWA devices.

Before describing the details of the various embodiments contemplated herein, it would be beneficial to describe a 5G network to which the aforementioned 5G FWA device may connect. FIG. 1 illustrates an example 5G network 100 in which or with which various embodiments of the present disclosure may be implemented. A mobile network can be thought of as comprising two component networks, the Radio Access Network (RAN) and the core network.

A mobile network's RAN may include various infrastructure, e.g., base stations/cell towers, masts, in-home/in-building infrastructure, and the like. The RAN allows users of mobile devices (also referred to as User Equipment (UE), e.g., smartphones, tablet computers, laptops, vehicle-implemented communication devices (e.g., vehicles having vehicle-to-vehicle (V2V) capabilities), to connect to the core network. FIG. 1 illustrates a plurality of 5G small base stations or small cells and 5G macro base stations or macro cells, i.e., 5G macro cells 106, 110, and 223, and 5G small cell 108.

Macro cells can refer to (tall, high-powered) "macro" base stations/cell towers that are able to maintain network signal strength across long/large distances. 5G macro cells may use Multiple Input, Multiple Output (MIMO) antennas that may have various components that allow data to be sent and/or received simultaneously. In the example 5G network 100 of FIG. 1, 5G macro cell 106 may provide wireless broadband coverage/communications to vehicles 120 and 122. 5G macro cell 110 may provide broadband service to an area, such as a city or municipality 128. Likewise, 5G macro cell 112 may provide broadband coverage to an area, such as a city or municipality 130. The MIMO antennas used by 5G macro cells may comprise large numbers of antenna elements, which can be referred to as massive MIMO, whose size may be comparable to, e.g., 3G and/or 4G base station antennas.

5G small cells can refer to wireless transmitters/receivers implemented as micro base stations designed to provide coverage to areas smaller than those afforded coverage by 5G macro cells, e.g., on the order of about 100 m to 200 m for outdoor 5G small cells. Indoor 5G small cell deployments may provide coverage on the order about 10 m. 5G small cells can be mounted or integrated into/onto streetlights, utility poles, buildings, etc., and like 5G macro cells, may also leverage massive MIMO antennas. In the example 5G network 100 of FIG. 1, 5G small cell 108 provides broadband coverage to house 124 and smartphone 126.

The core network may comprise the mobile exchange and data network used to manage the connections made to/from/via the RAN. As illustrated in FIG. 1, the core network of 5G network 100 may include central server 102 and local server 104. Central server 102 is shown to effectuate broadband service to area 130 by way of 5G macro cell 112. Central server 102 may also operatively connect to local server 104, which in turn, provides broadband connectivity by way of 5G macro cells 106 and 110, as well as 5G small cell 108. The use of distributed servers, such as local server 104 can improve response times, thereby reducing latency. The core network may leverage network function virtualization (instantiation of network functions using virtual machines via the cloud rather than hardware) and network slicing (segmentation of 5G network 100 in accordance with a particular application, industry, or other criteria) to provide these lower response times, and provide faster connectivity.

Figure 2:
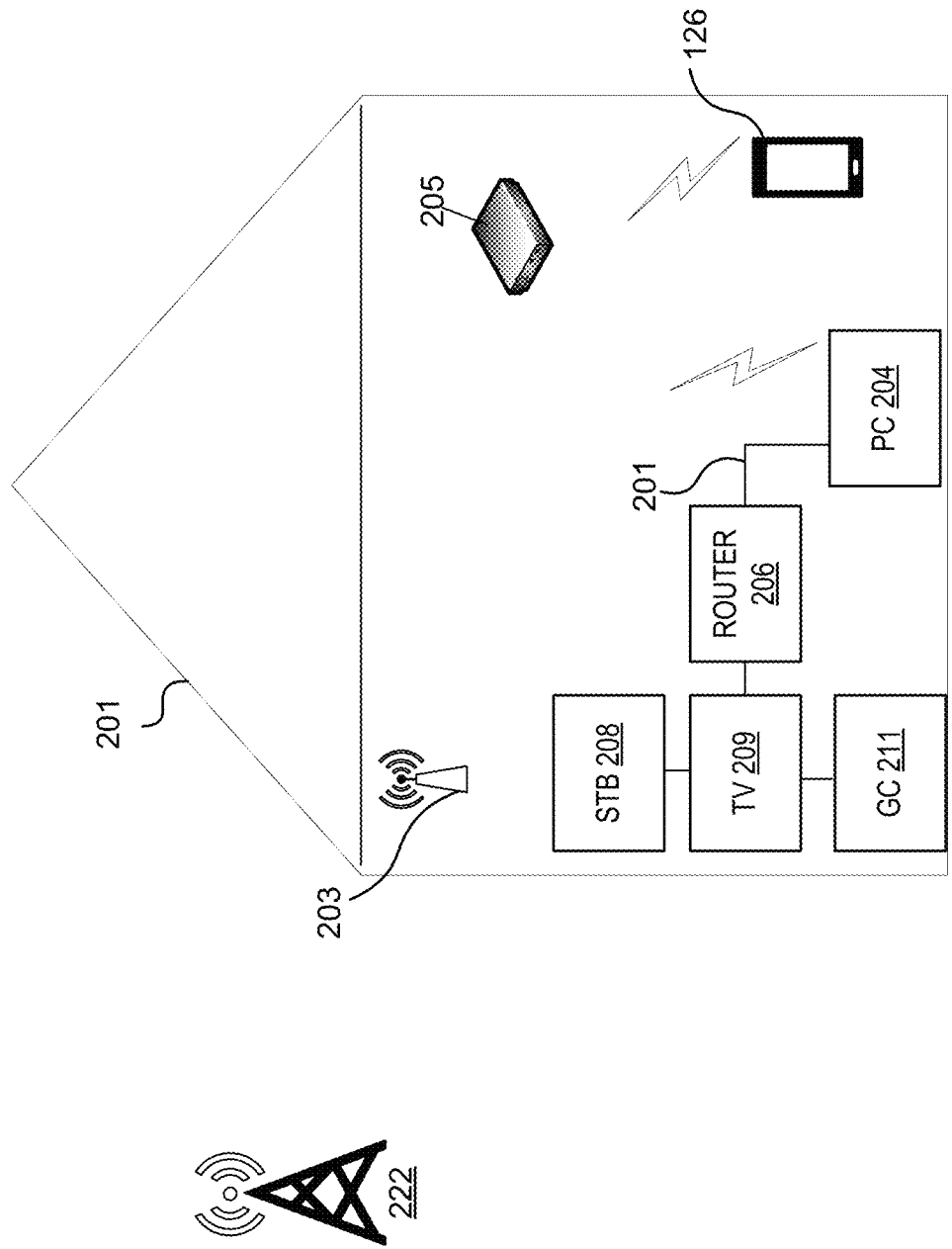
FIG. 2 illustrates an example structure in which a 5G FWA device may be installed in accordance with various embodiments of the present disclosure.

FIG. 2 illustrates an example of an in-home wireless and wired network 200 with which various embodiments may be implemented. The example of FIG. 2 shows a wired and wireless network 200 operating within a building 201. Building 201 may be a house, an apartment, an office suite or building, a warehouse, a retail establishment or other commercial, residential or government building.

FIG. 2 illustrates a wired network implemented using a wired communications medium 202. In some embodiments, the wired communications medium 202 may be a fiber optic cable system, an Ethernet cable system, a coaxial cable system, a power line system, or other physical communications medium. A wireless access point 203 is included in this example to provide a wireless network over which various devices within the building 201 may communicate wirelessly. For example, wireless access point 203 can function as a Wi-Fi router to create a Wi-Fi network over which the various devices can communicate. In this example, wireless access point 203 also includes a router so that it can communicate over wired communications medium 202.

FIG. 2 also illustrates a number of devices that can communicate wirelessly or over wired communications medium 202 as devices on the network 200. This example includes a smart phone 220, a smart TV 207, and personal computer (PC) 204 that can communicate wirelessly with wireless access point 203, for example. Additionally, FIG. 2 illustrates a router 206 that can communicate with wireless access point 203 via wired communications medium 202. Router 206 can further communicate with a set-top box 208, a television 209, and a gaming console 211 via a wired communications interface (not shown).

In some implementations, wireless access point 203 may be implemented as a Wi-Fi router for communications with devices within or within some proximity of the outside of building 201. Although various embodiments may be described in terms of this example environment, the technology disclosed herein can be implemented in any of a number of different environments.

FIG. 2 also illustrates an example 5G small cell 222 capable of providing 5G broadband service/coverage to building 201. In order for a user in building 201 to avail him/herself of 5G broadband service, the user may provision (or have 5G FWA device provisioned) for access to 5G broadband service (i.e. by devices in or around the building 201), as alluded to above, a 5G FWA device 205 may be installed somewhere inside or outside (and proximate to) building 201. 5G FWA access device 205 can be installed at indoor locations, such as ceiling, walls, fixtures, or doorways of the building 201. In other embodiments, it can be used or applied for outdoor installations as well, e.g., on a roof, along an external periphery of a building, etc. As used herein, installing or installation can refer to the physical act of position or affixing the 5G FWA device 205 to or within the building 201, for example to a ceiling, roof, or wall of the building. As used herein in the context of provisioning information, installation could also refer to the act of saving provisioning information (or other information) in a memory of the 5G FWA device 205.

In embodiments, a user can provision the 5G FWA device 205 at or before installation (i.e. fixation of the device), for example, by a provisioning application. As alluded to above, that application may be executed on a mobile device, e.g., smart phone, operated by the user. The application can also be executed at laptop, PC, or other device. These devices can include PC 204, and/or smartphone 126.

Figure 3:
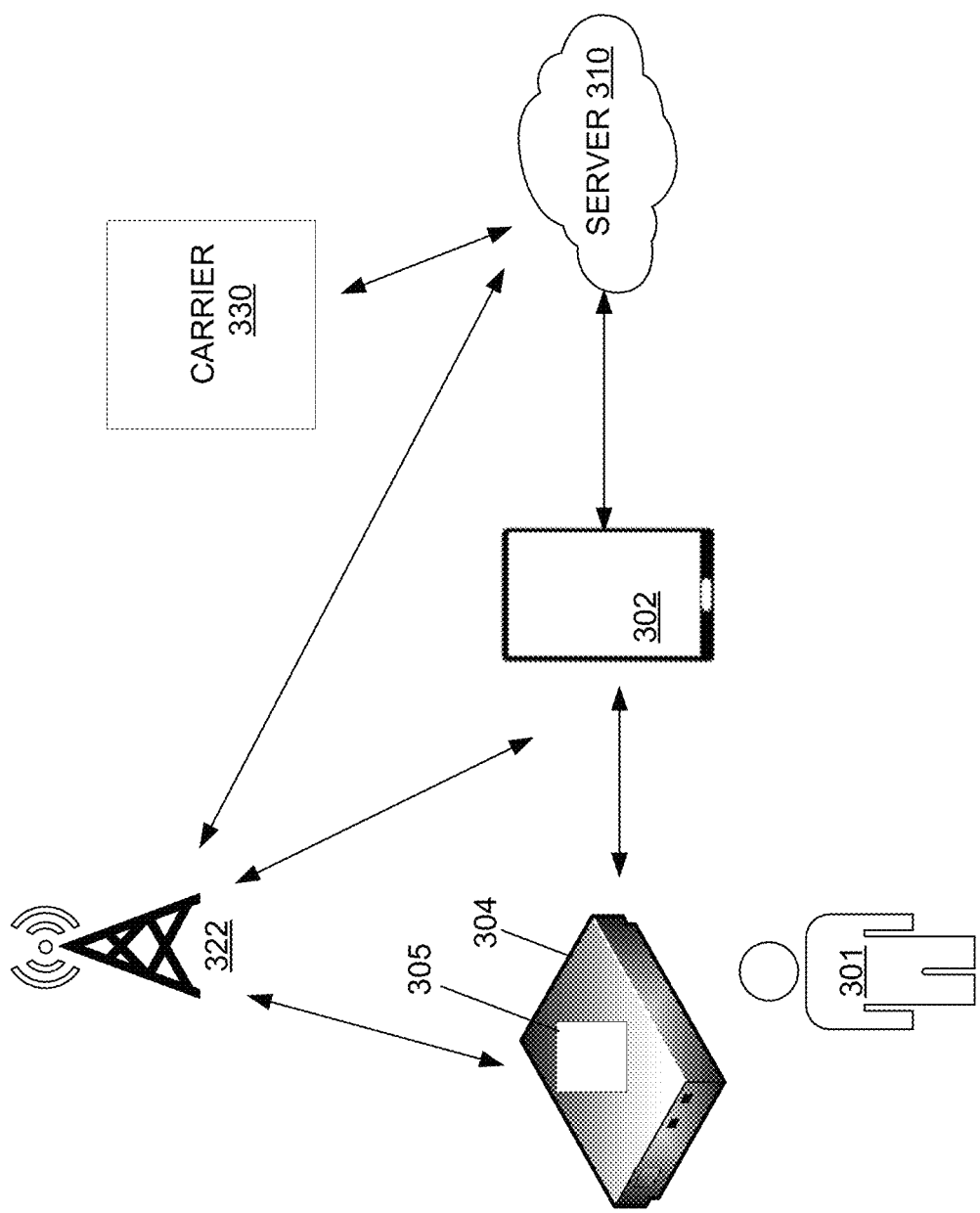
FIG. 3 is a schematic representation of an example 5G FWA device operatively communicating with a 5G smart cell and mobile device for effectuating a provisioning application in accordance with embodiments of the present disclosure.

Referring now to FIG. 3, a schematic representation of system 300 for provisioning a 5G FWA device is shown. The system 300 can include a user 301, a mobile device 302, 5G FWA device 304, and server 310. 5G FWA device 304 can be the same or similar to 5G FWA device 205 shown in FIG. 2.

With reference to FIG. 2, the system 300 can be used in or around building 201. The system 300 can be used in indoor and/or outdoor locations. The 5G FWA access device 304 can be installed in indoor locations, such as ceiling, walls or doorways of the building 201. In other embodiments, it can be used or applied for outdoor installations as well, e.g., on a roof, along an external periphery of a building, etc.

In general, a user may avail him/herself of 5G broadband service by way of the system 300. As will be described in greater detail below, a user 301 may execute a provisioning application on his/her mobile device 302. Although mobile device 302 is shown, it is understood that this device can be a mobile phone (e.g. smartphone 126 shown in FIG. 2), a laptop, PC (e.g. PC 204 shown in FIG. 2), or another 5G FWA device. With reference to FIG. 2, mobile device 302 can be connected to one or more networks, for example by access point 203 (and/or router 206), e.g. by wired and wireless network 200 operating within a building 201. Mobile device 302 can also access one or more broadband networks, for example by 5G small cell 222, shown as 5G small cell 322 in FIG. 3. B By way of access to the one or more networks, the mobile device 302 can be communicatively coupled to one or more server 310. Server 310 can be a local or central server, (shown as local server 105 or central server 102 in FIG. 1 for reference). 5G FWA device 304 may be operatively connected to server 310. Server 310 can be a cloud service/server that can be implemented and managed by an entity, such as a vendor of 5G FWA device 304. This connection can be established, e.g., over a cellular connection, e.g., a 5G cellular connection. Server 310 may in turn be operatively connected to one or more MNO or carrier 330, via an Internet connection or other available connection mechanism. Server 310 can periodically or aperiodically be updated with information from the 5G FWA vendor, one or more MNOs or carriers 330. For example, it could be updated with carrier specific provisioning information, as well as user and/or device 304 specific provisioning information. Various databases can be programmed with this information. This information can include user and/or device profiles, and other information that can identify users, devices, but also the carrier, service, and/or subscription. With respect to device specific (e.g. by International Mobile Equipment Identity ° MEW provisioning information, for example, a phone number can be assigned to the specific device by IMEI. It is understood that various information can constitute provisioning information, and that this information can be stored and/or retrieved from server 310, and at various stages described herein, can be stored and/or retrieved from other elements of system 300.

In various embodiments, the server 310 (or provisioning application, e.g. as executed at mobile device 302) can perform provisioning information/firmware versioning, provisioning information/firmware validation, or making sure the latest provisioning information/firmware is installed. The provisioning application may employ certain versioning logic, e.g., learning, feedback, predictive logic, etc. to provide a selection of appropriate information and/or firmware. As such, the provisioning application may employ intelligence logic so that appropriate (e.g. optimal, suitable, and/or latest) provisioning information, device and/or user profiles, firmware, software are installed or otherwise employed.

The server 310 can include searching and/or data entry means, such as conventional look-up-table and/or database structures for locating information, including by IMEI, or other identification information.

As discussed above, the provisioning application may at least be implemented on mobile device 302. In some embodiments, device management, and/or 5G FWA device installation may also be performed through mobile device 302. Device management and/or 5G FWA device installation (e.g. installation guidance) may be performed, for example, through a separate or integral to provisioning application, device management application and/or installation application.

Some of these functions may require access to information at server 310. Device management can involve tracking information regarding the use and/or performance of a 5G FWA device, such as 5G FWA device 304. For example a profile/information regarding the provisioned (or to be provisioned) 5G FWA device may be maintained the device management application. This can include information identifying the 5G FWA device 304, such IMEI number, model number, SKU, and mobile number can be maintained and presented. Additionally, software version or provisioning information versioning can also be maintained at tracked.

Additionally, information such as current operating conditions/characteristics can be maintained and presented to a user to allow the user to assess the operation of a provisioned 5G FWA device, or to assist customer service technicians in resolving customer/field issues.

With reference to the provisioning application, it should be understood that one or more mechanisms can be provided, such as pull-down menus and the like to access profiles or information corresponding to a plurality of provisioned or to be provisioned 5G FWA devices. Differing levels of access/use, e.g., that geared towards consumers or customer support technicians can be implemented. For example, more provisioning options (e.g. selecting profiles or other information at finer level of granularity), device management options and/or more to help debugging a field issue versus that which can be presented to a user (e.g., a user may not understand all details of provisioning options or device management).

As will be explained in further detail with reference to FIG. 4, the mobile device 302 can be communicatively coupled to the 5G FWA device 304 by a local connection. This can include, for example, Wi-Fi, Bluetooth®, Near-Field, or another wireless communication means. In some embodiments, the mobile device 302 may be connected to 5G FWA device 304 over a near field communications mechanism, e.g., Bluetooth®, Bluetooth LE, and so on, although other connectivity is contemplated. For example, mobile device 302 may connect to 5G FWA device 304 over a Wi-Fi channel(s). In some implementations, the local connection can be established by wired communication means. In embodiments, when the 5G FWA device 304 is turned on (i.e. by user 301), the mobile device 302 can be communicatively paired to 5G FWA device 304, for example, by the provisioning application. User 301 may command the provisioning application running on mobile device 302 to initiate (or it may automatically initiate) pairing to the 5G FWA device 304.

The mobile device 302 can be used to assist the user 301 in provisioning the 5G FWA device 304. As such, the 5G FWA device 304 can generally be a target device for/of provisioning. As alluded to previously, the provisioning information can allow for the 5G FWA device 304 to access 5G broadband coverage. Thus with the provisioning information, the 5G FWA device can operatively connect to 5G small cell 322 (and/or a 5G macro cell (not shown). 5G broadband coverage may be achieved by 5G FWA device 304 upon being operatively connected to the 5G small cell 322 and/or a 5G macro cell (not shown). Although a 5G FWA device 304 is shown, it is understood that any other network connected device that should be provisioned for access to the network (i.e. by 5G small cell 322 and/or 5G macro cell) can be a target device, and that methods and the system 300 described for provisioning applied to provisioning of other target devices.

User 301 may command the provisioning application running on mobile device 302 to initiate (or it may automatically initiate) provisioning of the 5G FWA device. The provisioning application can be executed before and/or after the user 301 has possession of the 5G FWA device 304 (i.e. in their vicinity for easy access to the 5G FWA device).

The 5G FWA device 304 can have identification information 305. Identification information can be disposed on an outer or inner surface of the 5G FWA device 304. Identification information may be visible on the 5G FWA device 304. For example, the identification information 305 can be disposed on a sticker which is applied on the 5G FWA device 304. The 5G FWA device may have been assigned identification information 305 at the factory (i.e. at manufacturing) or at a retailer. The identification information can similarly be disposed on or provided with packaging associated with the 5G FWA device 304. Identification information can include at least one of a serial number, model number, mobile number, a stock-keeping-unit (SKU), a universal product code (UPC) number, or an International Mobile Equipment Identity (IMEI) number. These are merely non-limiting examples. As another non-limiting example, identification information can be embedded in a quick-response (QR) code, or another visual code. Identification information can be stored in a memory (not shown) of the 5G FWA device.

In various embodiments, the user can execute the provisioning application before, during, or after the 5G device is powered on. In embodiments, the provisioning application can prompt the user 301 to provide the identification information 305 to the application. This information can be inputted (i.e. by user 301) into the mobile device 302, or otherwise determined by the provisioning application. For example, the provisioning application can prompt the user to scan the identification information (e.g. by a camera or other imaging sensor of the mobile device 302) and the provisioning application can recognize the identification information.

In embodiments, (e.g. if the identification information is stored in the memory of the 5G FWA device), the mobile device 302 can receive the identification information 305 by pairing (or other local connection) to the 5G FWA device 304.

In embodiments, the mobile device 305 can provide the identification information to server 310. Server 310 can, in response, provide to the mobile device 302, the provisioning information (e.g. by querying a database, look-up table, or other data structure). The provisioning information provided to the mobile device 302 from server 310 can include only the bare minimum parameters and software components which would be required for the 5G FWA device to access the cellular network.

In some embodiments, the user can provide user identifying information to the server 310 and the provisioning information is provided to the mobile device 302 based on the user identifying information. In embodiments, the server 310 can check if the 5G FWA device 304 has been provisioned. For example, if the device 304 had recently accessed the network, it may have been provisioned. In embodiments, the server 310 can check if the 5G FWA device 304 has an assigned carrier and/or a subscription. This can be determined by querying at the server 310. The provisioning application can be provided with provisioning status information (i.e. if the 5G FWA device is provisioned, to which carrier it is assigned, if it is updated with the latest provisioning or other information, i.e. version control) by the mobile device 304. Such provisioning status information can be graphically or visually presented to the user 301 via the provisioning application. In embodiments, if the 5G FWA device 304 is already provisioned, the provisioning information Is not provided to the mobile device 302, but rather an indication including this information (that the 5G FWA device is provisioned) is provided. In response, the provisioning application can ask the user if the device should be reprovisioned. In some embodiments, the provisioning information is still provided to the mobile device 302.

The user can use the provisioning application to sign up for a subscription (e.g. a network access plan) with a carrier. In embodiments, this step can be performed before, after, or in conjunction with the user activating or otherwise powering on the 5G FWA device 304. For example, the provisioning application can allow the user to select from one or more carriers and subscribe for wireless broadband access through one or more carriers. For example, the mobile device can retrieve user identifying information from the user 301, login information, and/or payment information. In embodiments, after the server 310 is provided with 5G FWA device identification information 305, the server can check if the device 304 has been assigned to a carrier, and/or to a subscription with that carrier. If the 5G FWA device 304 has not been assigned, then the provisioning application can prompt the user to sign up for a carrier and/or a subscription. The provisioning application can provide relevant information for setting up the subscription to the carrier, for example via server 310. Some or all of this information can be used to update information (e.g. at database, look-up table, or other data structure) at the server 310.

In embodiments, the provisioning information provided to the mobile device 302 from the server 310 is based on the user's selected carrier and/or subscription. It is understood that the 5G FWA device 304 identification information 305 may be required for the user to sign up with a carrier, or not. This determination can be made by the carrier. In embodiments, if the 5G FWA device 304 identification information 305 is required (e.g. by the carrier for a subscription to be created), the provisioning application can assist the user in retrieving this information (e.g., as was previously discussed, by scanning).

In some embodiments, the server 310 can provide provisioning information related to any (i.e. one, many, or all) of the available carriers to the mobile device 305. This implementation may be useful in case the 5G FWA device 304 should be provisioned without the user subscribing to a specific carrier or subscription. In any event, this would still allow for the various benefits of delaying the installing of provisioning information to the 5G FWA device 304 as described herein, such as making sure the latest (i.e. the most recent in time to power on or device use) provisioning information is provided.

In embodiments the mobile device 302, by the application, can retrieve provisioning information and other configuration files, or software settings, and/or other information from server 310 based on the subscription information, device 304 identification information 305, and/or user identification information. The mobile device 302 can push or deploy the provisioning information (and other information) to the 5G FWA device 304. In embodiments, the mobile device 302 can be communicatively linked or paired to the 5G FWA device 304 so that this information is provided to 5G FWA device 304.

As alluded to previously, all or part of the provisioning application can be executed at another device (not shown). This other device can include a PC, tablet, another 5G FWA device, and/or at the 5G FWA device. All or part of the provisioning application can be executed at another device instead of or in addition to the mobile device 302.

A direct, local connection can be effectuated between a to be provisioned 5G FWA device, such as 5G FWA device 304, and the other device, similarly to how a connection is established between 5G FWA device and mobile device 302. For example, the other device can access any one or more of the aforementioned aspects or functionality provided vis-à-vis the mobile device 302 based application through a web-based UI. A user may be able to switch between various UIs/user devices when managing a 5G FWA device 302. Thus, in some embodiments, current information, settings, profiles, etc. may be shared between various user devices, in this case, mobile device 302 and another device. As such, direct connections may be established between the many devices, and/or each of the devices can access server 310. In other embodiments, server 310 can be part of a cloud service which provides a centralized management function or service (e.g. centralized provisioning management) that can maintain the relevant provisioning information, settings, profiles, and so on, and periodically, aperiodically, and/or as needed, update or communicate such information or changes to mobile device 302, 5G FWA device 304, and other devices. Similarly, a user(s) may perform device management of a 5G FWA device(s) via a cloud-based service(s) accessible directly from the cloud service (which can be hosted on one or more servers, such as server 310). In this way, even if a user is remote from a provisioned 5G FWA device 304, he/she may effectuate control over/manage that 5G FWA device 304.

In some embodiments, one or more cloud APIs may be used by carrier 330, mobile device 302, and other devices (e.g. PC), to access server 310 based data, 5G FWA device 304 data, other cloud-based device application(s)/functionality(ies)/tool(s). Thus aspects of the provisioning, installation and/or device management application can be cloud based. For example, server 310 based cloud service may expose a REST interface via such cloud APIs that can be called by carrier 330, and mobile device 302, 5G FWA device 304, and other devices (such as PCs, tablet, etc.). It should be understood that use of the RESTful architecture is only an example, and other alternatives may be utilized. In some embodiments, such cloud APIs can be infrastructure APIs that can control the distribution of cloud services, e.g., device provisioning services as described herein. In some embodiments such cloud APIs may be software as a service APIs that can refer to application level APIs that facilitate connectivity between 5G FWA device 304 and other network entities/devices, e.g., mobile device 302, carrier 330, server 310, and other devices (e.g. P.C., tablet). In some embodiments, platform as a service APIs may be used to provide integration with messaging systems (for transmitting/receiving relevant 5G FWA device-related notifications, for example), databases (for obtaining/storing 5G FWA device-relevant information), etc.

As alluded to previously, the provisioning information can allow for the 5G FWA device 305 to access 5G broadband coverage. Thus with the provisioning information, the 5G FWA device can operatively connect to 5G small cell 322 (and/or a 5G macro cell (not shown). Provisioning information can thus be carrier 330 specific. 5G broadband coverage may be achieved by 5G FWA device 304 upon being operatively connected to a 5G small cell 322 and/or a 5G macro cell (not shown).

As described above, provisioning information may be required for the 5G FWA device to access to the broadband network. In accordance with various embodiments, the provisioning application can relay information between the mobile device 302 and the 5G FWA device 304 (e.g. by local connection), user 301 so that user 301 (with assistance from the provisioning application) can provision the 5G FWA device 304. For example, as will be explained in further detail later, the provisioning information can be relayed from the mobile device 302 to the 5G FWA device 304.

The provisioning information can then be stored at the 5G FWA device (e.g. in a fixed or removable memory, such as a subscriber identification module (SIM)). This information may be required for the device to initiate a connection to 5G small cell 322. The 5G FWA device may begin receiving signals from the 5G small cell 322. The 5G FWA device 304 may undergo an authentication and/or authorization process with 5G small cell 322. This may include determining that the device 304 has been assigned to a carrier network, and/or that an identity of the user 301 has been authenticated. This may also include determining that the device is authorized to access a specific region of the network.

It may be understood that authentication or connection information (such that the 5G FWA device has been authenticated (or not) and/or has received signals (or not) from the 5G small cell 322), could be included in the previously mentioned provisioning status information. This information can be graphically or visually presented to the user 301, for example by one or more cues, via the provisioning application. It is also understood that device 304 can access or attempt to access more than one 5G small cell 322, and such information could also be provided.

In embodiments, the provisioning application may require the user 301 to be in proximity to both the mobile device 302 and the 5G FWA device 305 so that that the user can access both and/or either. For example, the user 301 may be required to power on the 5G FWA device 301, scan or otherwise retrieve the 5G FWA device's identification information 305.

The user (or a professional) can install the 5G FWA device. The system 300 can further determine, with assistance from the provisioning application, the optimal placement of 5G FWA device 304. As illustrated in FIG. 3, user 301 may traverse structure 301 with both mobile device 302 and 5G FWA device 304. As the user traverses different areas within or about structure 301, the provisioning application running on mobile device 302 can present information such as signal strength, may run diagnostic tests, such as performance rating, upload speed, download speed, and/or latency times associated with the 5G FWA device 304.

User 301 may command the provisioning application running on mobile device 302 to initiate (or it may automatically initiate) testing to determine the quality of the 5G broadband coverage received or experienced by 5G FWA device 304 at that location from 5G small cell 322.

For example, (i.e. once installed with provisioning information) 5G FWA device 304 may attempt to initiate a connection to 5G small cell 322. It should be noted that 5G FWA device 304 may first undergo an authentication and/or authorization process with 5G small cell 322. Thereafter, 5G FWA device 304 may begin receiving signals from 5G small cell 322, and the 5G FWA device 304 can begin measuring the strength of the signals being received. In some embodiments, signal strength can be measured in dBm. A wireless receiver of the 5G FWA device 304 may receive such signals via an antenna, and determine the associated signal strength.

For example, 5G FWA device 304 may measure the Reference Signal Received Power (RSRP) Reference Signal Received Quality (RSRQ), Signal to Interference Plus Noise Ratio (SINR) parameters of a reference signal from 5G small cell 322. The signal strength can be translated into and presented as a graphical indication that the user may understand, e.g., graphical bars or other indications reflecting an approximate representation of signal strength. Such graphical indications can be presented by way of the provisioning application running on mobile device 302.

Additionally, the provisioning application may further perform diagnostics, e.g., determine upload speeds, download speeds, latency, and/or qualitative performance rating. One skilled in the art would understand how to implement the requisite functionality on 5G FWA device 304. This information could also be graphically or visually presented to the user via the provisioning application. In this way, the user can be made aware of any information relevant to the strength of the signal(s) received from 5G small cell 322, and the user can understand the relative strength/weakness of locating/orienting 5G FWA device 304 in that particular area. For example, in a Non-Standalone (NSA) 4G/5G RAN, a 5G FWA device, such as 5G FW 304, may ping a 5G small cell (also referred to as next generation NodeB (gNB)), and initially lock onto the 4G Long-Term Evolution (LTE) network for signaling information. It should be noted that 4G and 5G services may co-exist, e.g., 4G base stations/cells may be present in the same/nearby geographical area(s) in which 5G service is provided. If 5G network capacity is available, and there is a request for high throughput data, the data will be sent over the 5G network. The 5G FWA device and/or the provisioning application via the 5G FWA device will assess the 5G signal characteristics, and make a quantitative determination to translate the 5G signal characteristics into an appropriate number of representative signal bars (e.g., one to five bars) to display within the provisioning application. In some embodiments, the provisioning application may also display a performance rating (e.g., a value from one to four) for more precise, signal strength quality and performance representation in one location/orientation relative to another.

As described herein, location and orientation can both be taken into account when considering optimal positioning of a 5G FWA device relative to a 5G small cell/gNB. Accordingly, in some embodiments, the provisioning application may, e.g., by audible prompts or signals, visual prompts or signals, or some other type of prompt/signal or combination thereof, inform the user of the relative performance differences and/or suggestions regarding location and/or orientation of a 5G FWA device. In other embodiments, a user may be directed through other directions/notifications (e.g., separate documentation) to position the 5G FWA device in different locations/orientations at a particular location. In some embodiments, resident navigational functionality (GPS, compass, etc.) of a mobile device may be used by the provisioning application to determine location/orientation. In some embodiments, potential locations/orientations may be presented on a graphical map along with associated predicted/estimated performance ratings at those locations/orientations. For example, a user may be directed to position the mobile device on which the provisioning application is running near the 5G FWA device, and point or orient the mobile device in a particular direction that is indicative/representative of the direction/orientation in which, e.g., a front face of the 5G FWA device is directed/oriented to achieve a "baseline" orientation. In some embodiments, location-based functionality (e.g. resident navigational functionality (GPS, compass, ranging, signal strength, etc.) may be implemented and leveraged in the 5G FWA device itself. It should be understood that these are examples and not meant to be limiting.

In some embodiments, the above-mentioned RSRP/diagnostics information or data may be compiled and used to generate an RSRP heat map, which can also be presented to the user 301. The provisioning application may store such information until a time that the user wishes to see the RSRP heat map and/or the provisioning application has reached some determined threshold number of locations/orientations/positions for which RSRP/diagnostics information has been gathered. user 301. For example, in an area with a dense concentration of small cells, e.g., 5G small cells such as 5G small cell 322 (FIG. 3), more RSRP measurements may be taken to generate an RSRP heat map so as to attempt to assess connectivity to as many 5G small cells as possible. In other embodiments, the denser the population of 5G small cells, the less RSRP measurements may be taken (or the less different locations/orientations may be considered) as multiple options for connectivity to a 5G small cell may exist in any given location in/about structure 301.

In some embodiments, multiple RSRP/diagnostics information may be collected at a particular location and the location/orientation associated with the "best" or "strongest" RSRP measurements may be used to generate the RSRP heat map. In some embodiments, all collected information can be presented to the user vis-a-visa the RSRP heat map. In some embodiments, the provisioning application may continuously assess the locations/orientations associated with collected RSRP/diagnostics information, and may automatically weed out less-favorable locations/orientations based on continually/periodically updated RSRP/diagnostics assessments.

In some embodiments, the self-install application (or other implementations for device management) may collect or store the collected RSRP/diagnostics information, and may automatically prompt a re-provisioning process, or notify a user of a recommendation to perform re-provisioning of a previously provisioned 5G FWA device. For example, this may be applicable in case of new 5G small cells 322 joining the network, or new carriers joining the network after the initial provisioning.

In some embodiments, the collected RSRP/diagnostics information may be compared to one or more thresholds indicative of values, characteristics, etc., setting forth minimum or maximum operating values, characteristics, and the like. Upon a determination that the collected RSRP/diagnostics information meets or exceeds such a threshold(s), a notification to re-install a 5G FWA device may be generated and transmitted to a user, e.g., through the self-install/device management application, through an associated email account, etc. In some embodiments, the comparison of the collected RSRP/diagnostics information to the aforementioned threshold(s) may be tracked such that one or more trends regarding RSRP/diagnostics information can be identified. If such a trend(s) is projected to meet/exceed a relevant threshold, re-installation or notification prompting/suggesting re-installation can be triggered. It should be understood that during 5G network buildouts, as new 5G small cells are deployed, and 5G network connectivity densifies, the performance of a previously-provisioned 5G FWA devices at an original/previous location and/or orientation can change. Accordingly, the self-install/device management application may determine that with current network information, the 5G FWA device may get better performance in a different location/position within a particular structure.

FIG. 4A is an example schematic representation of 5G FWA device 304 that receives provisioning information, from mobile device 302. It should be understood that mobile device 302 may have a processor 302a and a memory unit 302b with which a provisioning application can be implemented in accordance with various embodiments. Memory 302b can include data, instructions, and/or routines Instructions and/or routines can be executable by the processor 302a and can cause aspects of the provisioning application to be executed on the mobile device 302.

The mobile device can further have a recognition circuit 302c and sensor 302d with which the mobile device with which aspects of the provisioning application can be implemented. Sensor 302d can be configured as a camera. Sensor 302d can be another sensor, such as microphone configured to detect audible information. For example, as previously alluded to, recognition circuit 302c can be configured to detect the 5G FWA device identification information 305 in an image or data scanned from sensor 302d. Recognition circuit 302 may include optical character recognition, natural language processing, and/or other recognition technologies implemented as circuits which can be used to identify the identification information 304 within signals or data generated by sensor 302d. They can be configured to detect the identification information within other contextual information, such as within a QR code, an image, a voice prompt, etc.

The mobile device 302 may include display 302e. Display 302e of the mobile device may be used to present various graphical/visual information, elements, instructions, cues, commands, prompts, interactive features and the like. In some embodiments these can be related to provisioning application, such as cues or commands related to steps for provisioning. Display 302e may be touchscreen display. Although not shown, mobile device 302 is understood to have microphones, speakers, and/or other interactive elements through which information may be input, received, transmitted, or otherwise communicated.

Figure 4:
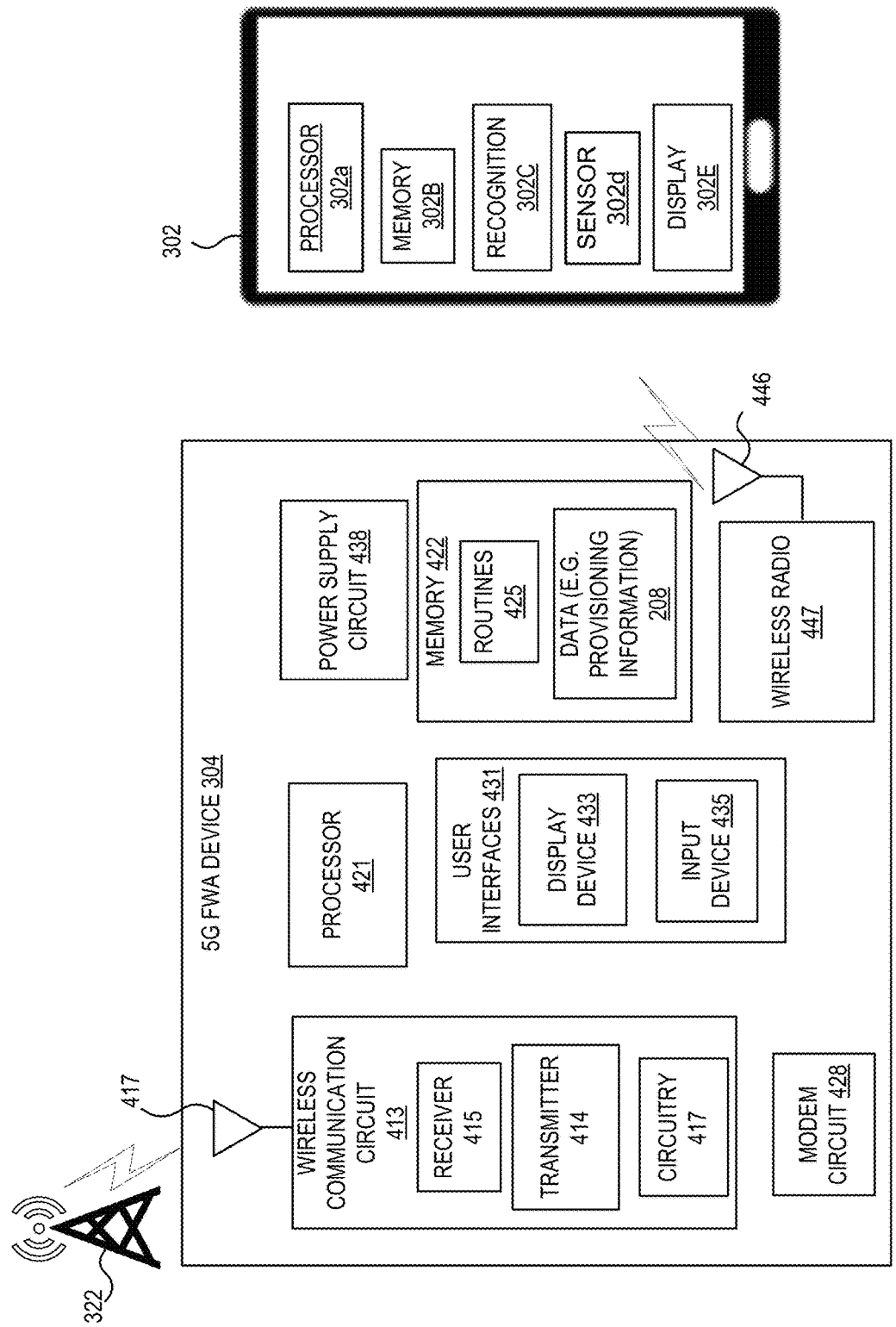
FIG. 4 illustrates a schematic representation of an example 5G FWA device in communication with a mobile device.

It is understood that the mobile device 302 can include one or more elements which are shown in FIG. 4 (and will be described next) that are shown as elements of 5G FWA device 304. It is also understood that 5G FWA device 304 can include one or more elements shown as part of mobile device 302, such as recognition circuit 302c and sensor 302d.

This example of 5G FWA device 304 includes a processor 421, memory 422, modem circuits 428, power supply circuits 438, and a wireless communication circuit 413 (e.g. a 5G wireless communication circuit). In some embodiments, 5G FWA device 304 may also include user interfaces 431 in the form of a display device 433 and an input device 435. In embodiments, 5G FWA identification information may be stored in memory 422, e.g. as part of data 208.

Processor 421 may be implemented as a dedicated or general-purpose processor or combination of processors or computing devices to carry out instructions and process data. Such instructions can be executable by the processor and can cause aspects of the provisioning application to be executed on the 5G FWA device 304. For example, processor 421 accesses memory 422 to carry out instructions, including routines 425, using data including data 423. For example, routines 425 may include routines to communicate with received signal strength of signals received from 5G FWA device 304 and/or run diagnostics, such as determining upload/download speeds and latency, or assigning a performance rating based on multiple signal/channel parameters. That information may be stored as data/as part of data 423. In some embodiments, routines 425 may include routines to automatically and periodically perform such measurements and/run such diagnostics. Routines 425 may include routines for responding to commands/instructions received from the provisioning application regarding when to attempt to access to a network, when to initiate measuring of received signal strength, when to provide information to the mobile device 302, etc.

That is, the provisioning-application may communicate one or more commands to 5G FWA device 304. These commands may include commands to initiate a connection with 5G small cell 322. Such a command may be transmitted from mobile device 302 wirelessly to wireless radio 447, and then these commands may be stored in memory 422. Routines 425 may include routines that are triggered upon receipt of such a command to instruct processor 421 to command wireless communications circuit 413 to begin communicating with 5G small cell 322. Upon receipt of signals from 5G small cell 322 at antenna 417, the signals are transmitted to communication circuitry 417, which may determine the received signal strength of the received signals from 5G small cell 322. The received signal strength information may be passed to memory 422 for permanent, semi-permanent, or temporary storage. Routines 425 may include routines to pass signal strength information, identification information, provisioning status, or other information or data via wireless radio 447 and antenna 446 to mobile device 302, whereupon the provisioning application may present, translate, or otherwise process the data for display to user 301 via display 302e.

As such, in some embodiments, routines 425 may include routines to transfer such information (e.g. provisioning status information) to wireless radio 447 to be transmitted to the provisioning application running on mobile device 302. In an embodiment where the provisioning application is executing on 5G FWA device 304, routines 425 may comprise routines for providing such information or data and/or processing such information into visual and/or auditory data that can be presented to user 301 via user interface 431. In such embodiments, user 301 may input certain information and/or commands via user interface 431, wherein some or more of the input information and/or commands may be sent to memory 422 and used/incorporated into routines 425 for controlling or managing one or more operational aspects of 5G FWA device 304. In some embodiments, routines 425 may be included for connecting to 5G small cell 322, and/or for effectuating authentication and/or authorization process with 5G small cell 322. In some embodiments, routines 425 may include routines effectuating operative connectivity and interactions with provisioning application running on mobile device 302 or running on 5G FWA device 304 itself. For example, the provisioning application may require user 301 to scan a code, e.g., a QR code, or input identification information associated with 5G FWA device 304. In some embodiments, routines 425 may include routines for periodically or aperiodically saving measurement, provisioning status, and/or diagnostic information as a log, cache, buffering such information, etc.

In still other embodiments, routines 425 may comprise routines for directing users to traverse an area, e.g., structure 361, randomly or in some other directed fashion, so that RSRP/diagnostics measurements may be taken with which an RSRP heat map can be generated. Accordingly, routines 425 may comprise routines to generate such an RSRP heat map (or multiple RSRP heat maps), and present the RSRP heat map to user 301.

It should be understood that the provisioning application may access information repositories maintaining information regarding the location of 5G small cells, the carriers or MNOs thereof, e.g., from carriers, mobile network operators (MNOs) or other entities having such information.

In some embodiments, routines 425 may comprise routines to present information regarding/relevant to provisioning may include but are not limited using voice assisted mechanisms, e.g., leveraging mobile device-resident functionality. In still other embodiments, routines 425 may include routines to effectuate one or more interfaces 431 using audible tones, beeps, and the like. In some embodiments, the use of such interfaces 431 or input/output mechanisms may avoid the need for a user to view information on a mobile device, instead being guided/being presented information via audio.

Processor 421 may include one or more single core, dual core, quad core or other multi-core processors. Processor 421 may be implemented using any processor or logic device, such as a Complex Instruction Set Computer (CISC)

microprocessor, a Reduced Instruction Set Computing (RISC) microprocessor, a Very Long Instruction Word (VLIW) microprocessor, a processor implementing a combination of instruction sets, or other processing device. Other modem circuits 428 may be provided to perform other modem functions.

Memory 422 includes one or more memory locations for storing instructions or other routines 425 and data 423. Memory 422 may be implemented using any machine-readable or computer-readable media to store data and instructions, including volatile and nonvolatile memory. Memory may be implemented, for example, as Read-Only Memory (ROM), Random-Access Memory (RAM), Dynamic RAM (DRAM), Double-Data-Rate DRAM (DDRAM), Synchronous DRAM (SDRAM), Static RAM (SRAM), Programmable ROM (PROM), Erasable Programmable ROM (EPROM), Electrically Erasable Programmable ROM (EEPROM), flash memory or other solid state memory, polymer memory, ferroelectric memory, Silicon-Oxide-Nitride-Oxide-Silicon (SONOS) memory, holographic or other optical storage, or other memory structures. As used herein, memory can include removable and/or reprogrammable storage, such as a SIM card or electronic SIM. Although memory 422 is illustrated as a separate component in FIG. 4, part or all of memory 422 can be implemented on the same integrated circuit as processor 421 or otherwise form part or all of embedded memory of processor 421. Although memory 322 is shown as a single component, it is understood that it can include one or more components, including multiple types of memory.

Wireless communication circuit 413 includes a wireless transmitter 414, a wireless receiver 415, communication circuitry 416 and antenna 417. Communication circuitry 416 may be implemented as a communications processor using any suitable processor logic device to provide appropriate communications operations such as, for example, baseband processing, modulation and demodulation, and other wireless communication operations. Where certain operations such as modulation and demodulation are performed in the digital domain, analog-to-digital and digital-to-analog conversion circuitry can be included to provide the appropriate interfaces between communication circuitry 416 and wireless transmitter 414 and wireless receiver 415. Wireless communications circuit 413 can allow for access to a 5G broadband network for example by 5G small cell 322. It is understood that multiple wireless communications circuits, transmitters, receivers, circuitry, and/or antennas can be included. This can allow for access to many (and various types) of networks/cells (e.g. with various technologies, at various bands alluded to above).

In this example, wireless radio 447 can include a wireless transmitter (not shown), a wireless receiver (not shown), antenna 446, and associated circuitry that allow for establishing a local communication between 5G FWA device 304 and mobile device 302. For example, this could allow for wireless communications between 5G FWA device 304 and mobile device 302 over Wi-Fi. In embodiments, at power-on, the 5G FWA device 304 may be configured to create a Wi-Fi network to which the mobile device 302 can connect, for example. In some embodiments, wireless radio 447 may include or alternatively comprise other wireless communication mechanisms, e.g., the requisite circuitry/componentry that allow for Bluetooth® communications, Near Field Communications (NFC), Zigbee, other short-range communications, or wired communications between 5G FWA device 304 and mobile device 302. In embodiments, wireless radio 447 can allow for pairing the 5G FWA device 304 to the mobile device 302 as described herein, including to establish a data connection between the mobile device 302 and the 5G FWA device 304, as well as server 310 (shown in FIG. 3) by way of the mobile device 302.

It is understood that multiple radios (and of various types) can also be included. It is also understood that other circuits can facilitate wired/wireline communication.

Wireless radio 447 may, for example, receive provisioning information from mobile device 302 as described herein. In other embodiments, wireless radio 447 may facilitate transmission of 5G FWA device 304 identification information to the mobile device 302. 5G FWA device 304 can transmit this information via wireless radio 447 (i.e. by transmitter) to mobile device 302, where the provisioning application running on mobile device 302 may modify, translate, and/or otherwise present that information in the form of data/graphics.

In the event 5G FWA device 304 incorporates user interface 431 (whether for allowing user 301 the ability to interact with 5G FWA device 304 for provisioning purposes, signal strength testing purposes, configuration/troubleshooting purposes, etc.), user interface 431 may include a display device 433 and an input device 435. Display device may include, for example, one or more LEDs; display screens, touch screens, or other alphanumeric displays, or other display devices to communicate data or other information to a user. Input device 435 may include buttons, a keypad, a touchscreen display, microphone, or other input device to accept input from a user. For example, in some embodiments, voice commands from user 301 may be used to control the provisioning application (if at least partially executed on 5G FWA device 304), and/or audio prompts or other information regarding, e.g., information that might otherwise (or in addition) be presented visually, can be provided to user 301. Display device 433 and input device 435 may include attendant circuitry such as drivers, receivers and processing or control circuitry to enable operation of the devices with 5G FWA device 304. User interfaces 431 can also include audio devices, such as one or more speakers. Audio devices can be configured to deliver one or more audio prompts or cues (e.g. associated with provisioning application) to the user 301.

Power supply circuit 438 can be included to provide power conditioning or power conversion for components of 5G FWA device 304. For example, power supply can supply power to different components of 5G FWA device 304 at specific voltage and current levels appropriate for those components. Power supply circuit 438 in this example, may receive power from a wired or wireless power source operatively connected to 5G FWA device 304. In some embodiments power supply 438 may be a battery power supply. In some embodiments, power supply 438 may be Power-over-Ethernet (PoE), where power can be carried over Ethernet wires (IEEE 802.3bt), where in some embodiments a PoE power injector can be built into a connected router/gateway, or can be a separate component with an AC adaptor that can be connected to the building mains. As alluded to above, user 301 may use provisioning application to provision the device 304. As such, the device should be powered on and active so that confirmation of provisioning (i.e. by establishing a connection to 5G small cell 322) is effectuated. Therefore, user 301 may connect an external power supply, such as an external battery pack (not shown in FIG. 4) to power the 5F FWA device 304. Alternatively, 5G FWA device 304 may be connected to a power outlet (not shown in FIG. 4) of building 201.

FIG. 5A illustrate various example cues or prompts 500 of the disclosed provisioning application in accordance with various embodiments. These cues can be associated to execution of provisioning application as described herein. These cues can be provided to the user 301 by way of various user interfaces described herein at mobile device 302, such as display 302e. These can also be audio cues provided by a speaker, for example.

It should be understood that more or less cues may be part of the provisioning application, and that the illustrated provisioning prompts or cues are merely non-limiting examples, nor is the order in which the cues are presented/described indicative of any set or requisite order that must be followed. It should be appreciated that various prompts, cues, buttons, and/or other graphical/visual interactive elements may be presented by the provisioning application to user 301 that allow user 301 to control operation of the provisioning application, provide confirmation that a particular cue/instruction/command has been followed (e.g. by the user 301 or another component of the system 300), and the like.

FIG. 5A illustrates that a user, e.g., user 301, may scan identification information 305 associated to the 5G FWA device 304, which can be, for example embedded in a QR code, As such, cues 500 can include a cue 505 directing the user to scan the identification information of or on the 5G FWA device 304 in order to identify 5G FWA device 304. Identification of 5G FWA device 304 may be useful in the event that user 301 seeks to install a plurality of 5G FWA devices. As such, the user 01 may be able to scan identification information for a plurality of devices 304. The provisioning application may assist in provisioning a plurality of devices 304. The application may retain information regarding, e.g., operational characteristics of each of the plurality of 5G FWA devices, etc. Alternatively, or in addition, the user 301 may be prompted, by the cue, to otherwise provide the identification information (e.g. by entering the information at a user interface, such as a touch screen display, or by dictating to the mobile device 302).

In response to the user 301 scanning the identification after providing cue 505, the provisioning application can detect the identification information within the information provided to the application (e.g. by recognition circuit 302c).

Further illustrated in FIG. 5A, is a cue 510 that can be displayed (or otherwise provided) by provisioning application instructing user 301 to power up the 5G FWA device 304. This cue can also instruct the user to connect 5G FWA device 304 to a power bank or other power source so that 5G FWA device 304 can operatively connect to a 5G small cell, e.g., 5G small cell 322 (e.g. by way of power supply circuit 438) As noted above, in some embodiments, 5G FWA device 304 may include a battery that can be charged so that 5G FWA device 304 can remain operative without being tethered physically to a power source. As alluded to above, cue 510 can be provided before 505. Alternatively, the prompt may be for the user to confirm the device is powered on, because the user may have already powered up the device 510 (for example by a cue or prompt displayed in or on packaging of the device 304).

Cues 500 may include another cue 515 that prompts the user to pair the 5G FWA device 304 with the mobile phone 302. In addition or alternatively, a cue can be provided to the user 301 that mobile device 302 has been paired with 5G FWA device 304. That cue can state that a local connection to the 5G FWA device 304 has been established.

Referring back to FIG. 4, routines 425 may include routines that cause processor 421 of 5G FWA device 304 to engage in a pairing process with mobile device 302 so that 5G FWA device 304 and mobile device 302 can communicate with each other, exchange information with each other, e.g., provisioning information, signal strength information, diagnostic information, control/management commands, etc. This communication can be described as a local communication (i.e. local to the mobile device 302 and the 5G FWA device 304, or otherwise within a local area such as building 201). In accordance with various embodiments, one skilled in the art would understand how to effectuate pairing in accordance with the requisite wireless or wired communications standard/mechanism being used, e.g., Wi-Fi®, Bluetooth®, NFC, etc. It should be appreciated that various cues and/or other graphical/visual interactive elements may be presented by the provisioning application to user 301 that provide confirmation that a particular instruction/command has been followed or otherwise been confirmed. As previously alluded, the identification information may be provided by way of this local communication. At this stage, once paired, the provisioning application can receive this identification information from the FWA by way of the local communication. The received identification information by local information can be used instead of or in addition to scanned (or otherwise entered or detected identification information 305. For example, it can be used to confirm successful retrieval or recognition of the identification information 305 after providing cue 505. In some embodiments, the identification information may be included in a network name (or other network id) of a network created by the 5G FWA device 304 to which the mobile device 302 connects to, and the mobile device 302 can be configured to detect such information (e.g. by recognition circuit 302c).

Cues 500 may include a cue 520 instructing the user 301 that mobile device is retrieving or has retrieved (already) provisioning information 520. As previously shown, this information can be retrieved (e.g. by querying), for example, at a database or server 310, and based on the identification information. Cue 520 may also include (or another cue may be provided), that includes provisioning status of the device 304 (for example, that the device's 304 provisioning information is up to date, and/or that the device 304 has been added to a subscription with a carrier.)

It is understood that the mobile device can then provide the provisioning information to the 5G FWA device as described herein, for example by way of the established local connection.

Cues 500 may include a cue 525 instructing the user 301 that mobile device has been provisioned. This cue may include that the 5G FWA device 304 has initiated and/or completed a connection to 5G small cell 322. The cue may include that the 5G FWA device received one or more signals from the 5G small cell 322 (e.g. by wireless communication circuit 413).

The provisioning application may initiate 5G service through 5G small cell 322 and reflect the corresponding progress through the provisioning application as part of one or more cues. The cue may include a confirmation that the 5G FWA device 304 was authenticated and/or authorized to access 5G small cell 322. As previously shown, this information (i.e. provided with this and/or other cues) can be retrieved at the mobile device 302 from 5G FWA device 304 (i.e. by local connectivity and/or by the 5G FWA device 304 sharing information with the mobile device 304 (e.g. via server 310, by cellular connectivity). Thus this information can be retrieved (in addition or alternatively) from database or server 310, including based on the identification information.

The same, or one or more other cues can also prompt the user 301 that the provisioning has failed, or that the 5G FWA device 304 was not able to access the network. This may also include a notification that the device 304 is not authorized to access the specific region of the network. This cue can also include a provisioning status as described herein, signal strength information as described herein.

One or more other cues can be used to assist the user in establishing a connection to the 5G FWA device (i.e. at all or a better or optimal connection). As alluded to herein, provisioning application may be part of, be provided in conjunction with, or include 5G FWA device management application and/or (guided) installation application. As such, cues 500 can also include cues related to the execution of these other applications.

For example, these cues may provide a textual (or auditory) instruction to user 301 to walk about the space in which user 301 is currently present (e.g., structure 301) so that the device 304 can sample received signal strengths. The cues may include the measuring received signal strength measured (and received by) by 5G FWA device 304, performance measurements related to rating, upload speeds, download speeds, latency, etc.

The 5G FWA device 304 information or profiles can be presented/organized in a variety of ways, including as part of cues 500. For example buttons or actuable icons representative of different information/sets of information can be set forth on display 302c. For example, a first set of information (e.g., a cue including "About Device") may include the 5G FWA device's identification information 305 and other information, e.g., model, SKU, firmware, IMEI, MAC, PTN information, firmware or software version, current operating conditions/characteristics (e.g., battery life, device health information (which may be gleaned from, e.g., online status information, temperature of the 5G FWA device, from data usage information (described below), and so on). It should be noted that the information displayed is dynamic and can vary in accordance with preferences set forth by the user, 5G FWA device manufacturer, vendor, carrier 330, etc.

Moreover, 5G FWA device-related or relevant information, such as information regarding the network to which the 5G FWA device is attached can be provided/accessed (e.g. as part of one or more cues 500). Below is a table of example types of data that can be obtained, used, updated, changed, etc. when provisioning or otherwise managing a 5G FWA device 304. Other data/types of data are contemplated as would be understood by those of ordinary skill in the art. It is also understood that this data can be retrieved from any element of system 300 shown in FIG. 3 (e.g. the 5g FWA device 304, user 301, carrier 330, etc.).

| Performance Data | Network Data | Device Data |
| --- | --- | --- |
| Performance Rating | Cell ID | Model #/Name |
| RSRP | Physical Cell ID (PCI) | IMEI # |
| RSRQ | Band ID | SKU # |
| SINR | Network Name | MAC Address |
| CQI Index | APN Name | IP Address |
| Downlink (DL) MCS | MDN | IMEI |
| Uplink (UL) MCS | SIM Carrier(s) | Firmware Ver. |
| CA Combos | CA Combos | ICCID |
| Aggregated Bands | Service Level (LTE, S6, mmW) | ICCID |
| Aggregated BW | BS/gNB/GIS information | Data Usage |

-continued

| Performance Data | Network Data | Device Data |
| --- | --- | --- |
| RT Latency (Ping) | NPDCCH Control Channel | Number of Resource Blocks Allocated |
| Resource Block Size SCS | Cyclic Prefix Beam Index | Block Error Rate |

It should be noted that some of the data or information listed above may be obtained during the provisioning process and/or installation process, but most tend to be dynamic and changing (sometimes constantly). These parameters can be extracted from the 5G FWA device (e.g. by connections described herein), and periodically pushed to the cloud service (e.g. at server 310 or another server), where they can be monitored and processed with cloud computing resources that can include the use of one or more AI, machine learning, or similar algorithms/mechanisms for determining the preferred provisioning information and other information, software, firmware, (e.g. versions), carriers, subscriptions, but also the preferred installation locations/positions for the 5G FWA device.

Data usage information may comprise additional information regarding the installed 5G FWA device that can be provided to the user (e.g. by one or more cues 500), and can include the amount of data uploaded and/or downloaded via the 5G FWA device, one or more statistics, trends or other data usage-specific information, such as times, days, weeks, etc. of heaviest/lightest usage, data usage maxima/minima, network/device performance trends, and so on. If available, data usage information may include types of data traffic traversed through the 5G FWA device. A user may set forth certain parameters regarding data usage and/or specify how data usage information can be presented.

It should be noted that in some embodiments, data usage information can be analyzed and further optimization information can be provided to a user. For example, it may be observed that data throughput through an installed 5G FWA device may fall below some threshold, and may prompt an option notifying a user to re-install/find another location/orientation of the installed 5G FWA device. That is, the location/orientation of the installed 5G FWA device may have shifted or otherwise changed, the operating environment may have changed, the performance of the 5G small cell to which the installed 5G FWA device connects may have changed, etc. Similarly, 5G FWA device may need to be re-provisioned, or the user may be prompted to or otherwise request to reprovision the device 304. For example, the user 301 may decide to change network carriers 330, or may be prompted for options to change carriers 330, subscriptions, phone numbers, etc.

Moreover, processor 302a of mobile device 300 may fetch, decode, and/or execute instructions or logic to analyze current operating status (again of the provisioning application and/or 5G FW device 304) and translate such operating status into corresponding instructions, indications, prompts, and the like. For example, memory 302b of mobile device may comprise a repository of, e.g., textual indications, prompts, etc. that can be triggered to be presented via display 302e upon the operating condition of the provisioning application and/or 5G FWA device 304 reaching a certain state. In some embodiments, as noted above, the various applications may employ certain guidance logic, e.g., learning, feedback, predictive logic, etc. to provide guidance to a user. The processor 302a may execute instructions or logic to effectuate prompts, indicators, instructions, etc., commensurate with the guidance logic.

Other cues may include presentation of relevant information (e.g. as part of a dashboard) regarding 5G FWA device 304 and/or any relevant information, e.g., operational characteristics, identifying information, information on the installation, etc. Self installation application and device management application, and associated functionality and example cues, commands or prompts, as alluded to above, are included in U.S. patent application Ser. Nos. 17/028,197 and 17/142,902 which are incorporated herein by reference.

Figure 5:
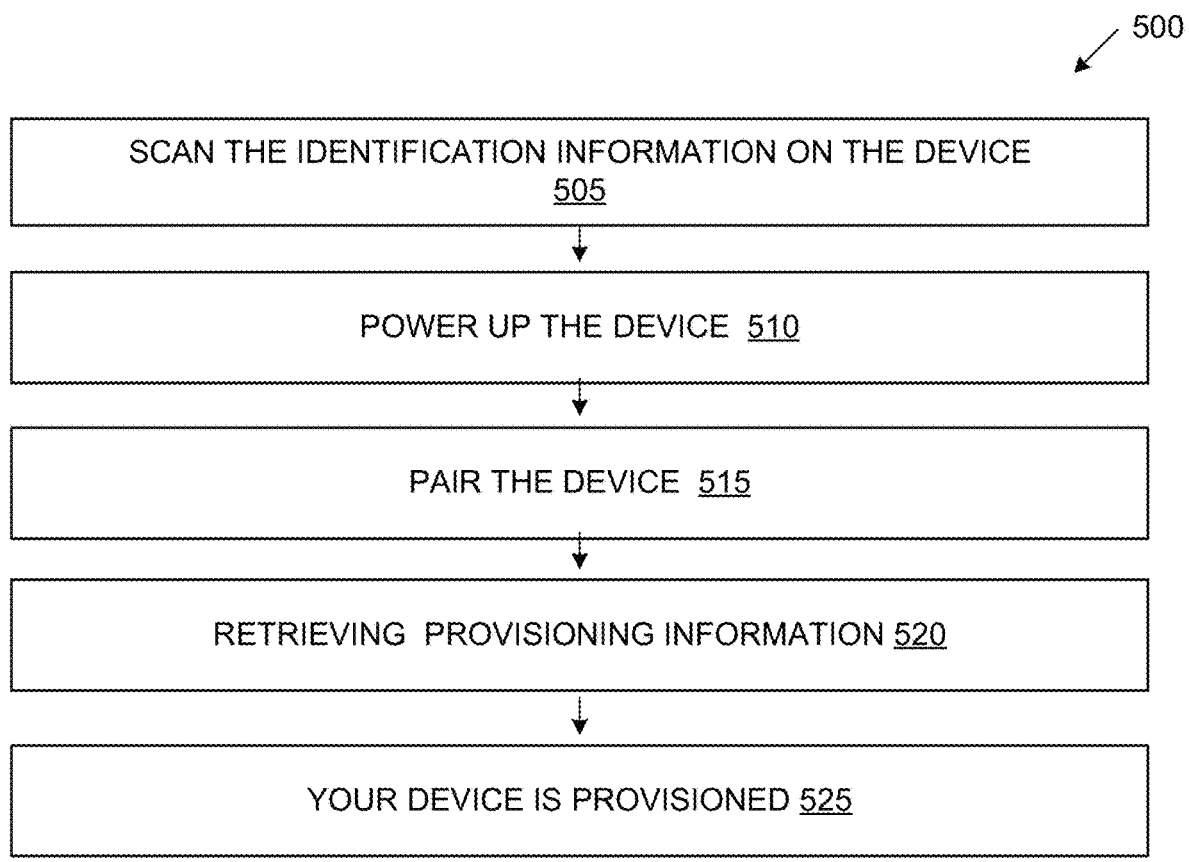
FIG. 5 illustrates example cues that can be part of an application used for provisioning application of a 5G FWA device.

In accordance with another embodiment, a "professional" version of the provisioning application may be provided, where the same/similar cues operations as those illustrated in FIG. 5 and described herein may be performed. It should be noted that in a professional embodiment, the user need not necessarily engage in any button presses/input any information to the provisioning application up to this point. This is because a professional installer or someone with experience/knowledge installing such devices needs less guidance/direction/interaction with the provisioning application. As such, the number of cues 500 provided may also be less.

The provisioning application may ask user 301, (a professional, or other user with relatively more experience than an end-user consumer, or the end-user), whether the user has a subscription to a carrier, and if not, whether he/she intends to create such a subscription. In some embodiments, a user can have more than one carrier and/or subscriptions. In some embodiments, the provisioning application may present various cues related to these subscriptions, including allowing the user to start a subscription, prompting the user with available carriers and related information (such as coverage, prices, etc.). It is understood that provisioning application could also provide various cues related to user authentication and/or creation of user profiles. It is understood that the user can be presented with various options related to service and use of the 5G FWA device. The provisioning information (e.g. associated to cue 520), can be related to the user's various responses. For example, the provisioning information can be carrier specific (to one or more carriers) and/or region specific.

Other cues can also present an option to restart the provisioning process if desired. In other embodiments, the user may be provided with a summary record of all or some of the provisioning results, e.g., resulting performance characteristics, carrier settings, installation location information, installer information, and so on may be aggregated, and can be presented as a report and/or the relevant information can be used to generate a report or summary presentation.

As alluded to and described above, orientation of 5G FWA device 304 in addition to location/placement can be considered to obtain optimal service. As illustrated in FIG. 5F, in one embodiment instructions may be provided on display 302C of mobile device 302 to advise the user to, e.g., orient 5G FWA device 304 to it is pointing towards a base station (small cell) and away from obstructions, walls, etc.). FIG. 5G illustrates an example screen where a numerical and/or star (or other) ranking can be provided to the user via the provisioning application. This can be provided in addition to or instead of textual signal strength "rankings" such as "Good," "Excellent," etc. as shown in FIG. 5D, as part of the ranking (see, e.g., FIGS. 4D, 4F and the corresponding descriptions above) process, the ranking assigned or calculated regarding a particular location/orientation may be provided to the user in addition to a suggestion (when the ranking is low (or falls below/exceeds some threshold) to attempt to re-orient 5G FWA device 304 to obtain better results.

Figure 6:
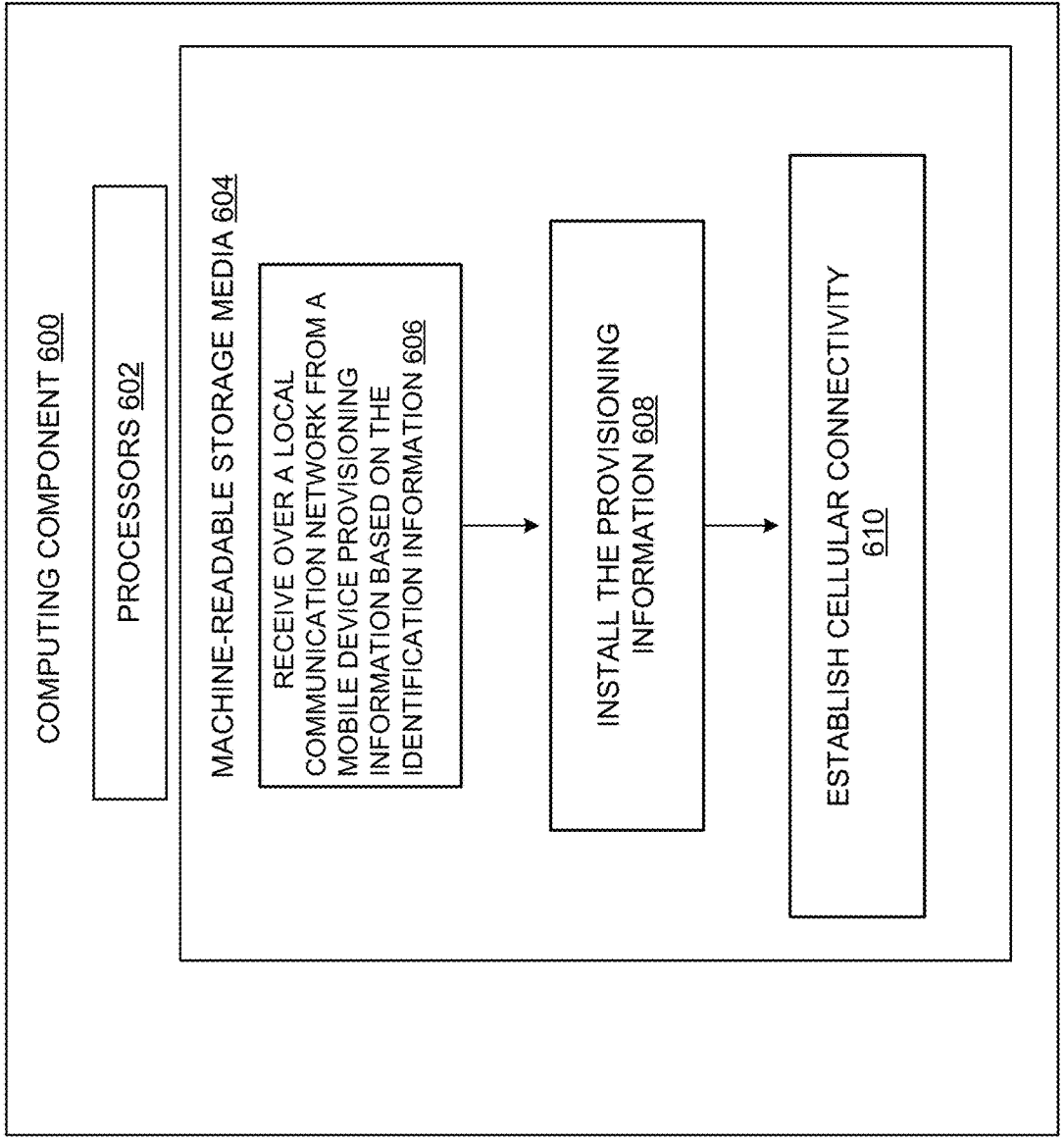
FIG. 6 illustrates an example computing component at a FWA device capable of executing instructions for effectuating provisioning of a FWA device in accordance with one embodiment of the disclosed technology.

FIG. 6 is a block diagram of an example computing component or device 600 for performing provisioning application functions in accordance with one embodiment. Computing component 600 may be, for example, located at FWA device 304 (such as processor 421 and/or memory 422). In the example implementation of FIG. 6, computing component 600 includes a hardware processor 602, and machine-readable storage medium 604.

Hardware processor 602 may be one or more Central Processing Units (CPUs), semiconductor-based microprocessors, and/or other hardware devices suitable for retrieval and execution of instructions stored in machine-readable storage medium, 604. Hardware processor 602 may fetch, decode, and execute instructions, such as instructions 606-608, to control processes or operations for installing provisioning information as part of a provisioning application of a 5G FWA device in accordance with one embodiment. As an alternative or in addition to retrieving and executing instructions, hardware processor 602 may include one or more electronic circuits that include electronic components for performing the functionality of one or more instructions, such as a Field Programmable Gate Array (FPGA), Application Specific Integrated Circuit (ASIC), or other electronic circuits.

A machine-readable storage medium, such as machine-readable storage medium 604, may be any electronic, magnetic, optical, or other physical storage device that contains or stores executable instructions. Thus, machine-readable storage medium 604 may be, for example, Random Access Memory (RAM), Non-Volatile RAM (NVRAM), an Electrically Erasable Programmable Read-Only Memory (EEPROM), a storage device, an optical disc, and the like. In some embodiments, machine-readable storage medium 604 may be a non-transitory storage medium, where the term "non-transitory" does not encompass transitory propagating signals. As described in detail below, machine-readable storage medium 604 may be encoded with executable instructions, for example, instructions 606-610, which may be representative of an embodiment of the aforementioned provisioning application. Executable instruction can include or relate to one or more previously discussed routines 425 shown in FIG. 4.

As alluded to above, hardware processor 602 may be an embodiment of a processor of 5G FWA device 304, and upon executing a provisioning application (at the mobile device 302) that a user may utilize to provision the 5G FWA device 304, the provisioning application may pair the mobile device and the 5G FWA device (generally by a local communication), to allow the exchange of information or data therebetween. As alluded to above, the provisioning application may allow for the mobile device 304 to retrieve a 5G FWA device 304 identification information, and use this to retrieve provisioning information for the device.

As such, hardware processor 602 may execute instruction 606 to establish a local communication network with mobile device 302. Instruction 606 may include receiving over the local communication network from the mobile device 302, provisioning information based on identification information of the 5G FWA device 302. With reference to FIG. 3, this may be represented as line between Mobile device 302 and mobile device 304.

Hardware processor 602 may execute instruction 608 to install the provisioning information at the 5G FWA device 304. This may include providing the provisioning information to memory (e.g. memory 422 or a SIM). Instruction 608 can also include installing other information, such as software settings (which may have been received from mobile device 302).

As alluded to above, 5G FWA device 304 may need to be provisioned (i.e. have provisioning information installed) so that it can access a 5G broadband network (e.g. by small cell 322). Hardware processor 602 may execute instruction 610 for establishing cellular connectivity. Cellular connectivity can be a connection to a broadband network, for example by 5G small cell 222 shown in FIG. 2, or shown as 5G small cell 322 in FIG. 3.

In embodiments, when cellular connectivity is established, 5G FWA device can access server 310. After accessing server 310, it can determine, e.g. based on 5G FWA device 304 identification information 305, if is other software or settings that should be updated. The 5G FWA device can periodically receive over the air updates.

It is also understood that these other updates for the 5G FWA device can also be provided to the 5G FWA device 304 from the mobile device 302, for example, with, before, and/or subsequent to providing the provisioning information. It is also understood that not only initial firmware updates (i.e. those known to the user post-power-on), but also subsequent or intermittent updates, updates for changing carriers, etc. can be provided. These updates (for example, for bug fixes, latest software, and/or other portions of the firmware) can be performed over the air (i.e. over the cellular network). Various updates can include transmitting instructions to add to or change the various instructions or routines in the 5G FWA devices' memory.

As previously alluded to, hardware processor may further execute other instructions for providing confirmation (e.g. of established connectivity), provisioning status, signal strength information, and other information as described herein to the mobile device 302 (i.e. by the previously established local connection, cellular connectivity, or another connection).

As alluded to herein, hardware processor may include instructions as part of a device management application and/or (guided) installation application that can be utilized in conjunction with or part of the provisioning application.

As alluded to herein, hardware processor 602 may execute other instructions to determine operating characteristics of the 5G FWA device relative to one or more 5G cell and in one or more locations where the 5G FWA device is placed, and/or to determine provisioning status for the device. For example, hardware processor 602 can execute instruction to determine the operating characteristics of the 5G FWA device 304, the provisioning status information, and other information, e.g., to the user of the mobile device 302. In this way, a user of the provisioning application may be made aware of relevant information that may be useful for provisioning the device, but also for installation and use of the 5G FWA device. Relevant non-limiting operating characteristics may include received signal strength, performance rating, data upload speed, data download speed, and/or latency experienced by the 5G FWA device at a particular location depending on its connectivity to one or more 5G cell.

Accordingly, in some embodiments, as illustrated in FIG. 6, operations 606, 608, and/or 610 (and other operations) may comprise at least a portion of operations associated to provisioning a 5G FWA device by a provisioning application.

Figure 7:
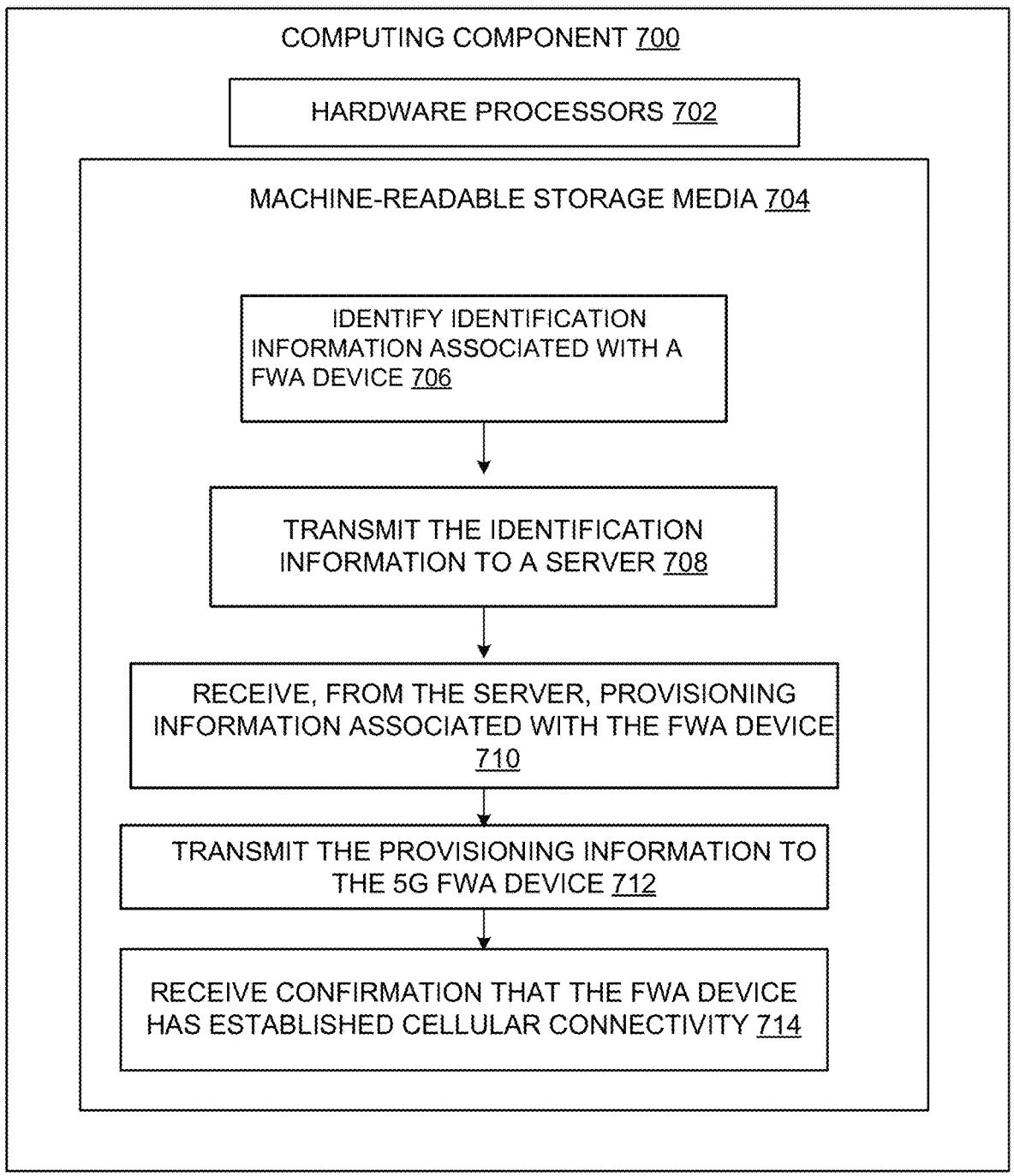
FIG. 7 illustrates a computing component at a mobile device capable of executing instructions for effectuating provisioning of a FWA device in accordance with one embodiment of the disclosed technology.

FIG. 7 illustrates an example computing component which can be included as part of a mobile device 302 as described herein. Various aspects of provisioning applications, device management application, and/or installation application may executed at the computing component. As such, mobile device 302 can generally be considered a (5G FWA) device management device which can facilitate and manage various aspects described herein.

The example implementation of FIG. 7, computing component 700 can include hardware processor(s) 702, and machine-readable storage medium 704. Computing components, hardware predecessors, and machine-readable storage medium have been described here, for example with reference to FIG. 6. Processor(s) 702 can include processor 302*a* as described with reference to FIG. 4. Machine-readable storage medium 704 can include memory 302*b* as described with reference to FIG. 4.

As previously alluded to, aspects of the provisioning application can be implemented at a mobile device 302. For example, in some embodiments, and as described above, the mobile device 302 can be directly paired to or paired with the provisioned 5G FWA device 302. Alternatively, or in addition, the mobile device 302 can be a computing device, server, etc. that operatively connects to and pairs with the provisioned 5G FWA device through a remote connection, such as through a cloud service. In this way, not only may a user, e.g., end-user/consumer, professional installer, network administrator, etc. provision and/or control one or more 5G FWA devices in an optimized fashion, but may further subsequently manage one or more 5G FWA devices.

For example, FIG. 5 shows cues than can prompt various actions by the user at the provisioning application. As described with reference to FIG. 7, it is understood that such actions, such as providing the previously mentioned cues, can include respective instructions for execution of the action, such as instructions for providing various prompts or cues to the user 301 (not shown in FIG. 7).

As such, machine readable storage may include instructions 706, 708, 710, 712, and 714 related to instructions executed by the mobile device 302 for providing aspects of the provisioning application.

Instruction 706 can include identifying identification information for the FWA device 806. As alluded to previously, 5G FWA device 304 can have associated identification information. This information can be received through various means described here, including for example through sensor 302*d* described with reference to FIG. 4, and the identification information can be appropriately identified (e.g. by recognition circuit 302*c*).

Instruction 708 can include instruction for transmitting the identification information to a server. Server can be the previously described server 310 (e.g. database thereof). With reference to FIG. 3, this may be shown as the line from mobile device 302 to server 310. Alternatively or in addition, the mobile device 302 can query the server 310 for information based on the identification information. The identification information can relate to 5G FWA device 304.

Instruction 710 can be included for retrieving, from the server, provisioning information associated with the 5G FWA device 304. The instruction 710 can also include receiving the provisioning information. The provisioning information can be associated with the 5G FWA device 304 by being based on the 5G FWA device 304 identification information 305. As described herein, other information can be received from server 310, and computing component 800 can include related associated instructions. For example, software or firmware alluded to above for updating the 5G FWA device can be retrieved. With reference to FIG. 3, the connection between the server 310 and the mobile device 305 may be shown as the line from server 310 to mobile device 302. The provisioning information retrieved from server 310, and other information, can be stored locally at the mobile device 302 before providing to the 5G FWA device (generally employing a catch and release strategy). Alternatively, this information may not be stored (albeit temporarily).

At instruction 710, it is understood that the retrieved provisioning information can include only such information and/or software components that would be required for the device 304 to access a cellular network. Other settings, software, profiles, firmware, etc. can also be retrieved. In other embodiments, the retrieved information can include information, such as software or firmware updates necessary for bug fixes, or related to optional features of the 5G FWA device 304 other than network connection.

It is understood that any type of information that a 5G FWA device vendor or network carrier intend to update the 5G FWA device with could be provided by this method.

As previously alluded to, user 301 can command the provisioning application running on mobile device 302 to initiate (or it may automatically initiate) pairing to the 5G FWA device 304. As such 5G FWA device 304 can establish a local connection to/with mobile device 304.

Instruction 712 can be included for transmitting the provisioning information to the 5G FWA device 304. With reference to FIG. 3, this may be shown as the line from mobile device 302 to 5G FWA device 304. This transmission may be by the previously mentioned local connection. The information provided to the 5G FWA device can include just enough information so that the 5G FWA device can access the network. For example, it may be that absent the provisioning information, the FWA device 304 could not establish cellular connectivity.

It is understood that other updates for the 5G FWA device can also be provided to the 5G FWA device 304 from the mobile device 302, such as information or updates required beyond just for establishing a cellular connection. It is also understood that not only initial firmware updates (i.e. those known to the system 300 post device 304 power-on, and/or when the device 304 is provisioned), but also subsequent or intermittent updates may be provided to the 5G FWA device 304 via the mobile device 302 by methods described herein. For example, these can include updates for changing carriers, intermittent software updates, etc.

In embodiments, only the bare minimum parameters and software components that are required for the 5G FWA device to access a cellular network are provided to the FWA device 304 from the mobile device 302. Then, the mobile device 302 can then "leave the picture" and the rest of the updates for the 5G FWA device (e.g. for bug fixes and/or other portions of the firmware) can be performed over the air (i.e. over the cellular network).

Other instructions, related to provisioning, device management, and/or installation can also be included, such as retrieving and/or transmitting information and/or providing cues for various information. For example, instructions to remotely control 5G FWA device so that it accesses the cellular network may be provided. Other instructions can include waiting for a response from the 5G FWA device that it has accessed the cellular network or otherwise established connectivity.

For example, instructions may allow for retrieving information from the 5G FWA device, such as operational, performance, identifying, and data usage-related information related to the 5G FWA device. In some embodiments this information can be received/obtained directly from the 5G FWA device, and/or via server 310. As described above, such 5G FWA device-related information can be a myriad of data/types of data ranging from the modulation and coding scheme (MCS) value at the 5G FWA device to performance data regarding one or more connected devices, such as Wi-Fi-capable devices connected to and using the 5G FWA device to effectuate communications with one or more other networks. Information identifying the 5G FWA device can be retrieved along with firmware version information, serial number, health information, and so on. Moreover, data regarding the network on which the 5G FWA device is operating can also be retrieved for review, analysis, notifications, etc. When communicating directly with the 5G FWA device, the mobile device 302 device can communicate over a wireless connection mechanism, e.g., BLE or Wi-Fi, or over a wired connection, e.g., via an Ethernet cable.

As alluded to above, subsequent to provisioning of a FWA device, various embodiments may provide installation (i.e. physical installation) guidance, and/or device monitoring/management functionality to a user. As such, various instructions can be included to effectuate these aspects of the provisioning, installation guidance, and/or device monitoring/management functionality. For example, as previously alluded to, storage media 704 can further include instructions related to retrieving performance, identifying, operating characteristics, and/or data usage information related to the 5G FWA device, and presenting at least a subset of the least one of the retrieved performance, identifying, and data usage related information to the user. As other examples, the device can include instructions that provide guidance regarding optimal placement of the 5G FWA device relative to a 5G cell.

In some embodiments the user may be an end-consumer, or the user may be a professional installer. Although various embodiments have been described in the context of 5G wireless broadband services and/or devices, the provisioning application disclosed herein may be adapted for use in other contexts where other types of device and/or services may be employed.

Figure 8:
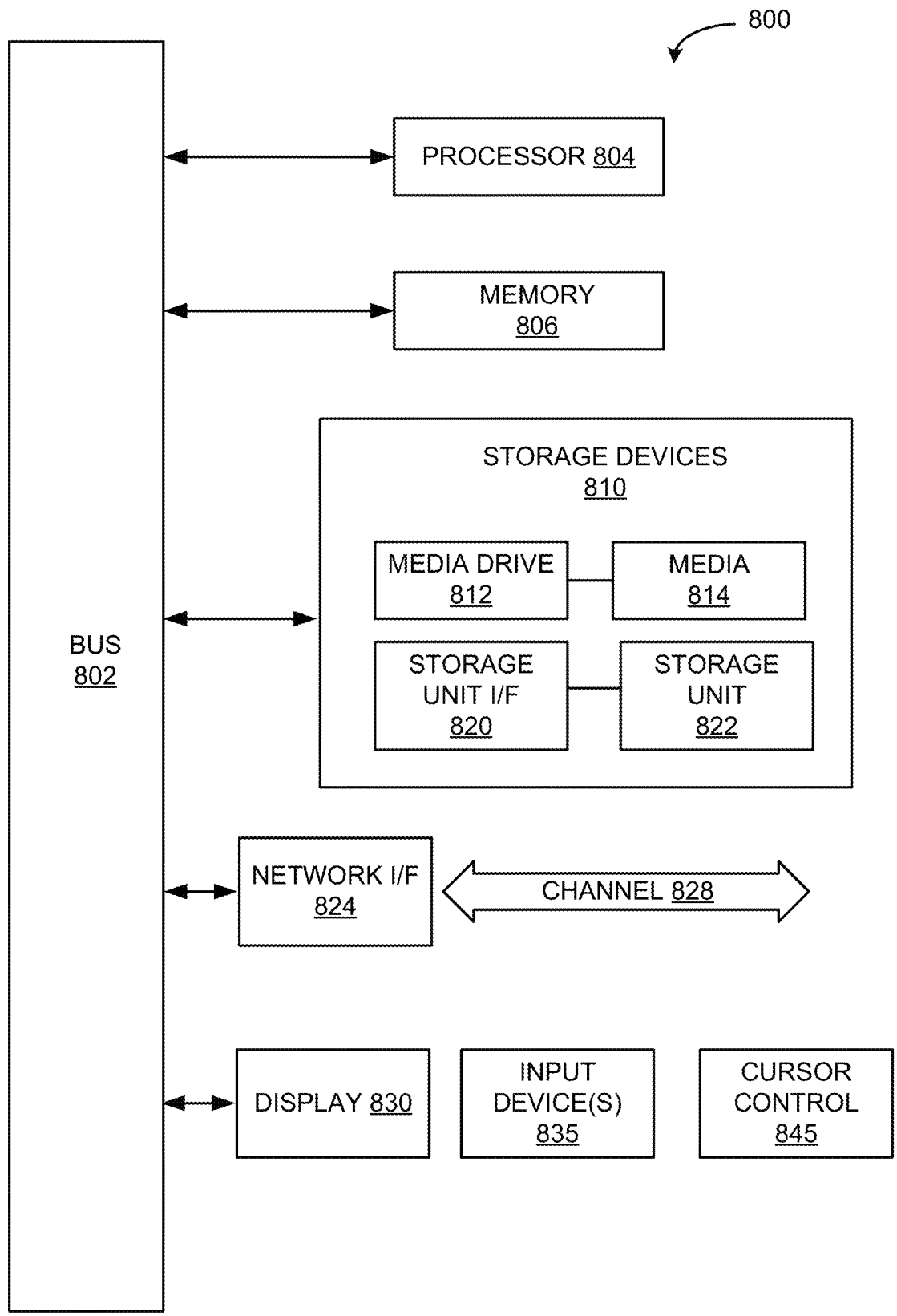
FIG. 8 is an example computing component that may be used to implement various features of embodiments described in the present disclosure.

FIG. 8 depicts a block diagram of an example computer system 800 in which various of the embodiments described herein may be implemented. The computer system 800 includes a bus 802 or other communication mechanism for communicating information, one or more hardware processors 804 coupled with bus 802 for processing information. Hardware processor(s) 804 may be, for example, one or more general purpose microprocessors.

The computer system 800 also includes a main memory 806, such as a Random Access Memory (RAM), cache and/or other dynamic storage devices, coupled to bus 802 for storing information and instructions to be executed by processor 804. Main memory 806 also may be used for storing temporary variables or other intermediate information during execution of instructions to be executed by processor 804. Such instructions, when stored in storage media accessible to processor 804, render computer system 800 into a special-purpose machine that is customized to perform the operations specified in the instructions.

The computer system 800 further includes a Read Only Memory (ROM) 822 or other static storage device coupled to bus 802 for storing static information and instructions for processor 804. A storage device 810, such as a magnetic disk, optical disk, or USB thumb drive (Flash drive), etc., is provided and coupled to bus 802 for storing information and instructions. Also coupled to bus 802 are a display 830 for displaying various information, data, media, etc., input device(s) 835 for allowing a user of computer system 800 to control, manipulate, and/or interact with computer system 800. One manner of interaction may be through a cursor control 845, such as a computer mouse or similar control/navigation mechanism.

In general, the word "engine," "component," "system," "database," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor(s) 804 executing one or more sequences of one or more instructions contained in main memory 806. Such instructions may be read into main memory 806 from another storage medium, such as storage device 88. Execution of the sequences of instructions contained in main memory 806 causes processor(s) 804 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 810. Volatile media includes dynamic memory, such as main memory 806. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 802. Transmission media can also take the form of acoustic or light waves, such as those generated during radio-wave and infra-red data communications.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent.

What is claimed is:

1. A Fixed Wireless Access (FWA) device, comprising:
   identification information disposed on an exterior surface of the FWA device;
   a processor;
   a memory unit operatively coupled to the processor, the memory unit comprising computer code that when executed, causes the processor to:
   receive over a local communication network from a mobile device, provisioning information associated with the FWA device based on the identification information;
   install the provisioning information in the memory unit; and
   establish cellular connectivity with a network base station based on the provisioning information;
   wherein the provisioning information was obtained by the mobile device scanning the identification information, providing the identification information to a server, and receiving the provisioning information from the server based on the identification information.

2. The fixed wireless access device of claim 1, wherein absent the provisioning information, the FWA device could not establish cellular connectivity.

3. The fixed wireless access device of claim 1, wherein the memory unit comprises computer code that when executed, causes the processor to transmit a confirmation over the local communication network to the mobile device that cellular connectivity has been established.

4. The fixed wireless access device of claim 3, wherein the confirmation includes operational characteristics related to the cellular connection.

5. The fixed wireless access device of claim 1, wherein the memory unit comprises computer code that when executed, causes the processor to receive over the local communication network from a mobile device, instructions to add to or change the computer code to add to the memory unit.

6. The fixed wireless access device of claim 1, wherein the memory unit comprises computer code that when executed, causes the processor to receive updates to the program code in the memory unit by the cellular connection.

7. The fixed wireless access device of claim 1, wherein the FWA device is a 5G capable FWA device, and wherein the network base station is a 5G small cell or 5G macro base station.

8. The fixed wireless access device of claim 1, wherein the local communication network comprises a near field communications wireless channel or a wired channel.

9. The fixed wireless access device of claim 1, wherein the identification information disposed on the exterior surface of the FWA device is embedded in a quick response (QR) code.

10. A mobile device for provisioning cellular connectivity information to a Fixed Wireless Access (FWA) device, comprising:
   a sensor;
   one or more processors:
      a memory unit operatively coupled to the processor, the memory unit comprising computer code that when executed, causes the processor to:
      obtain first identification information associated with the FWA device by imaging at least a portion of the FWA device by the sensor;
      retrieve, from a server, provisioning information associated with the FWA device;
      transmit the provisioning information to the FWA device over a local communication network; and
      receive a confirmation from the server or the FWA device over the local communication network that the FWA device has established cellular connectivity with a network base station based on the installation of the provisioning information.

11. The mobile device of claim 10, wherein the memory unit includes computer code that when executed causes the processor to transmit the first identification information to the server.

12. The mobile device of claim 11, wherein the retrieved provisioning information associated with a FWA device is based on the transmitted first identification information.

13. The mobile device of claim 10 wherein the provisioning information is transmitted to the FWA device over a Wi-Fi channel or a near field communications channel.

14. The mobile device of claim 10, wherein the computer code includes a provisioning application executable on the mobile device.

15. The mobile device of claim 10 wherein, the provisioning application includes one or more presented cues which guide a user in establishing a cellular service, align the sensor with the at least a portion of the FWA device for imaging by the sensor.

16. The mobile device of claim 10 wherein absent transmission of the provisioning information to the FWA device, the FWA device could not establish cellular connectivity.

17. The mobile device of claim 10 wherein the memory unit includes computer code that when executed causes the processor to receive second identification information associated with the FWA device from the FWA device and confirm the second identification information from the FWA device matches the first identification information obtained by imaging the at least a portion of the FWA device by the sensor.

18. The mobile device of claim 10, wherein the first identification information is embedded in a quick response (QR) code at the FWA device.

19. The mobile device of claim 10, wherein the mobile device is a smartphone, tablet, personal computer, or laptop.

20. A mobile device for provisioning cellular connectivity information to a Fixed Wireless Access (FWA) device, comprising:
   a sensor;
   one or more processors:
      a memory unit operatively coupled to the processor, the memory unit comprising computer code that when executed, causes the processor to:
      obtain first identification information associated with the FWA device by imaging at least a portion of the FWA device by the sensor
      retrieve, from the server, provisioning information associated with the FWA device; and
      transmit the provisioning information to the FWA device over a local communication network;
      wherein the computer code includes a provisioning application executable on the mobile device, the provisioning application including one or more presented cues which guide a user in establishing a cellular service, and aligning the sensor with the at least a portion of the FWA device for imaging by the sensor.

* * * * *